US012643273B2

(12) United States Patent
Hotta et al.

(10) Patent No.: US 12,643,273 B2
(45) Date of Patent: Jun. 2, 2026

(54) CONTROLLER FOR INJECTION MOLDING MACHINE, INJECTION MOLDING MACHINE, METHOD OF CONTROLLING INJECTION MOLDING MACHINE, AND STORAGE MEDIUM

(71) Applicant: SUMITOMO HEAVY INDUSTRIES, LTD., Tokyo (JP)

(72) Inventors: Daigo Hotta, Chiba (JP); Hajime Ono, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 509 days.

(21) Appl. No.: 18/059,052

(22) Filed: Nov. 28, 2022

(65) Prior Publication Data

US 2023/0166438 A1     Jun. 1, 2023

(30) Foreign Application Priority Data

Nov. 29, 2021     (JP) ................................. 2021-193532

(51) Int. Cl.
   B29C 45/78       (2006.01)
   B29C 45/76       (2006.01)

(52) U.S. Cl.
   CPC ...... B29C 45/78 (2013.01); B29C 2045/7606 (2013.01); B29C 2945/76073 (2013.01);
(Continued)

(58) Field of Classification Search
   CPC ............ B29C 45/78; B29C 2045/7606; B29C 2945/76073; B29C 2945/76531;
(Continued)

(56) References Cited

U.S. PATENT DOCUMENTS 5,494,623 A * 2/1996 Miyahara ................ B29C 45/76
                                                                  425/169
2003/0047828 A1* 3/2003 Koyama ................ B29C 45/74
                                                                  264/40.6
(Continued)

FOREIGN PATENT DOCUMENTS

JP        1995176083      * 12/1993
JP        H06-114906        4/1994
(Continued)

OTHER PUBLICATIONS

Kraussmaffei Group Gmbh; Compact. Efficient. Flexible. Machines of the CX series; Company brochure; 2nd edition Aug. 2017.
(Continued)

*Primary Examiner* — Alicia M. Choi
(74) *Attorney, Agent, or Firm* — IPUSA, PLLC

(57)           ABSTRACT
A controller for an injection molding machine includes a hardware processor. The hardware processor is configured to output a screen. The screen includes an entry field for entering a completion time at which the increasing of temperature of a temperature-controlled member is completed. The temperature-controlled member is subjected to temperature control in the injection molding machine. The hardware processor is further configured to receive an entry of the completion time in the entry field.

9 Claims, 9 Drawing Sheets

(52) U.S. Cl.
CPC .............. *B29C 2945/76531* (2013.01); *B29C 2945/76658* (2013.01)

(58) Field of Classification Search
CPC .......... B29C 2945/76658; B29C 45/73; B29C 2945/7604; B29C 45/76; B29C 45/80; B29C 2945/76732; B29C 45/74; B29C 45/2737
See application file for complete search history.

(56) References Cited

U.S. PATENT DOCUMENTS

| | | | | |
|---|---|---|---|---|
| 2003/0082255 A1* | 5/2003 | Konishi | .................. | B29C 45/76 425/173 |
| 2011/0269084 A1* | 11/2011 | Ito | ........................... | B29C 45/78 432/1 |
| 2020/0078998 A1* | 3/2020 | Lawless, III | .......... | B29C 45/762 |

FOREIGN PATENT DOCUMENTS

| | | | |
|---|---|---|---|
| JP | H06-262659 | | 9/1994 |
| JP | 1997029807 | * | 7/1995 |
| JP | H07-176083 | | 7/1995 |
| JP | H09-029807 | | 2/1997 |
| JP | H09-277337 | | 10/1997 |
| JP | 2006088482 A | * | 4/2006 |
| JP | 2011-230381 | | 11/2011 |
| JP | 2016083778 A | * | 5/2016 |
| JP | 2018008423 A | * | 1/2018 |
| JP | 2021-049689 | | 4/2021 |
| KR | 2016-0060395 A | * | 5/2016 |

OTHER PUBLICATIONS

Kraussmaffei Technologies Gmbh; Weekly timer for the MC6 control system; Kunststoffe.de; Product news of Feb. 23, 2016.

* cited by examiner

CONTROLLER FOR INJECTION MOLDING MACHINE, INJECTION MOLDING MACHINE, METHOD OF CONTROLLING INJECTION MOLDING MACHINE, AND STORAGE MEDIUM

CROSS-REFERENCE TO RELATED APPLICATION

This application is based upon and claims priority to Japanese Patent Application No. 2021-193532, filed on Nov. 29, 2021, the entire contents of which are incorporated herein by reference.

BACKGROUND

Technical Field

The present invention relates to controllers for an injection molding machine, injection molding machines, methods of controlling an injection molding machine, and storage media.

Description of Related Art

Injection molding machines include a cylinder fed with resin pellets as a molding material and a heater that heats the cylinder to melt the resin pellets. Injection molding machines manufacture molding products by melting the resin pellets in the cylinder and filling a cavity space inside a mold unit with the molten resin.

Various proposals have been made for heater control for melting resin pellets in injection molding machines.

For example, a technique to set an operation start time using a timer is proposed because it takes time before molding is performable after starting to increase temperature with heater control.

SUMMARY

According to an aspect of the present invention, a controller for an injection molding machine includes a hardware processor. The hardware processor is configured to output a screen. The screen includes an entry field for entering a completion time at which the increasing of temperature of a temperature-controlled member is completed. The temperature-controlled member is subjected to temperature control in the injection molding machine. The hardware processor is further configured to receive an entry of the completion time in the entry field.

DETAILED DESCRIPTION

Figure 1:
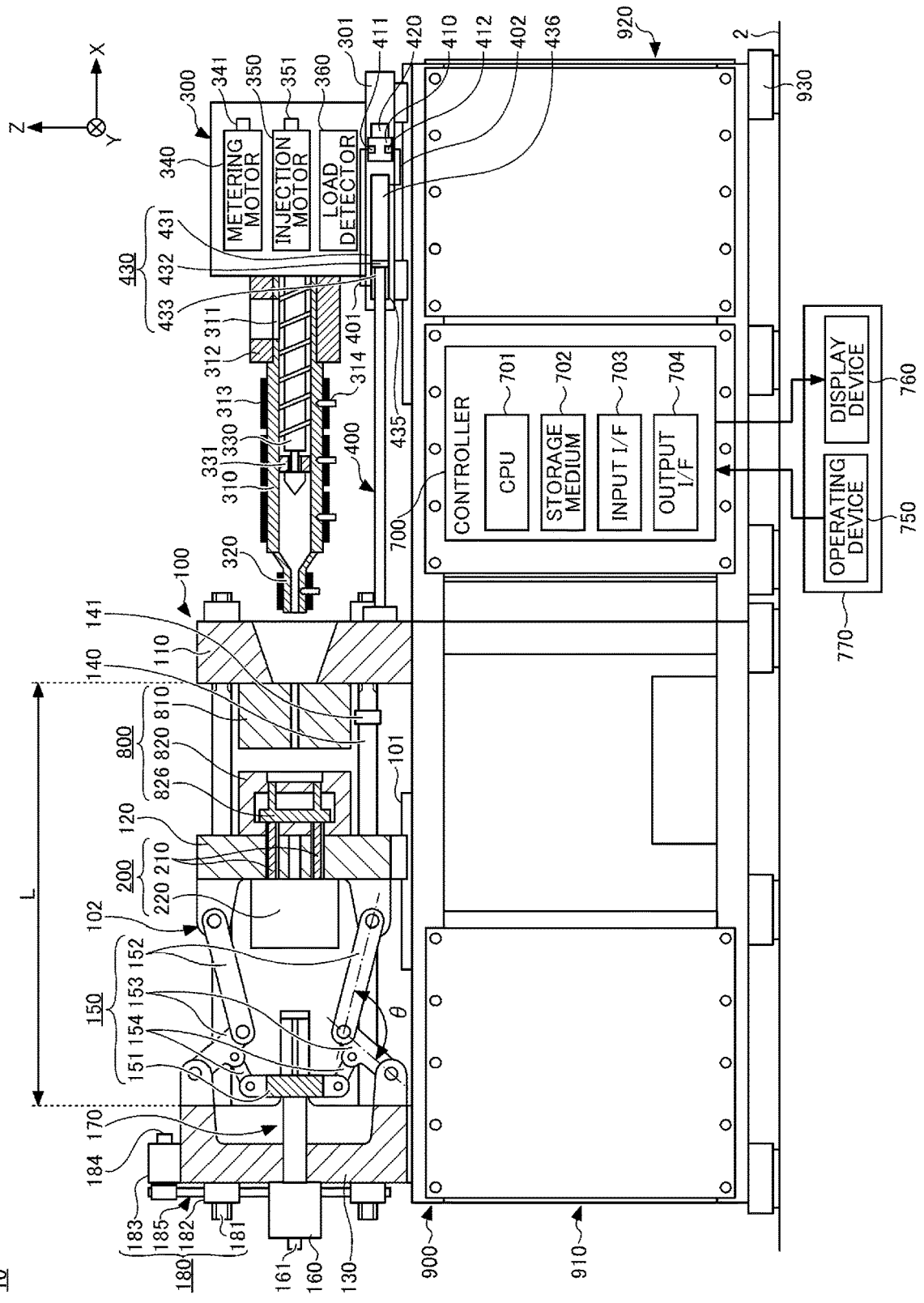
FIG. 1 is a diagram illustrating the state of an injection molding machine according to an embodiment at the completion of mold opening.

According to the above-described related-art technique, when a user wants to perform molding, the user has to consider time necessary to complete the increasing of temperature to set the start time of the increasing of temperature. Thus, in setting the start time of the increasing of temperature, a user has to predict the completion time of the increasing of temperature, which reduces practical convenience.

An aspect of the present invention provides a technique to efficiently start molding by making it possible to receive the input of the completion time of the increasing of temperature to perform control to complete the increasing of the temperature of a temperature-controlled member at the input completion time.

According to an embodiment of the present invention, it is possible to receive an entry of the completion time of the increasing of temperature. Therefore, by controlling the increasing of the temperature of a temperature-controlled member to be completed at the entered completion time, it is possible to prevent an injection molding machine from being left from the completion of the increasing of temperature to a worker's start of work and to prevent the occurrence of a situation where the increasing of temperature is not completed when a worker comes to a workplace. Therefore, it is possible to improve efficiency in starting work and improve productivity.

An embodiment of the present invention is described below with reference to the drawings. In the drawings, the same or corresponding configurations are referred to using the same or corresponding numerals, and a description thereof may be omitted.

Figure 2:
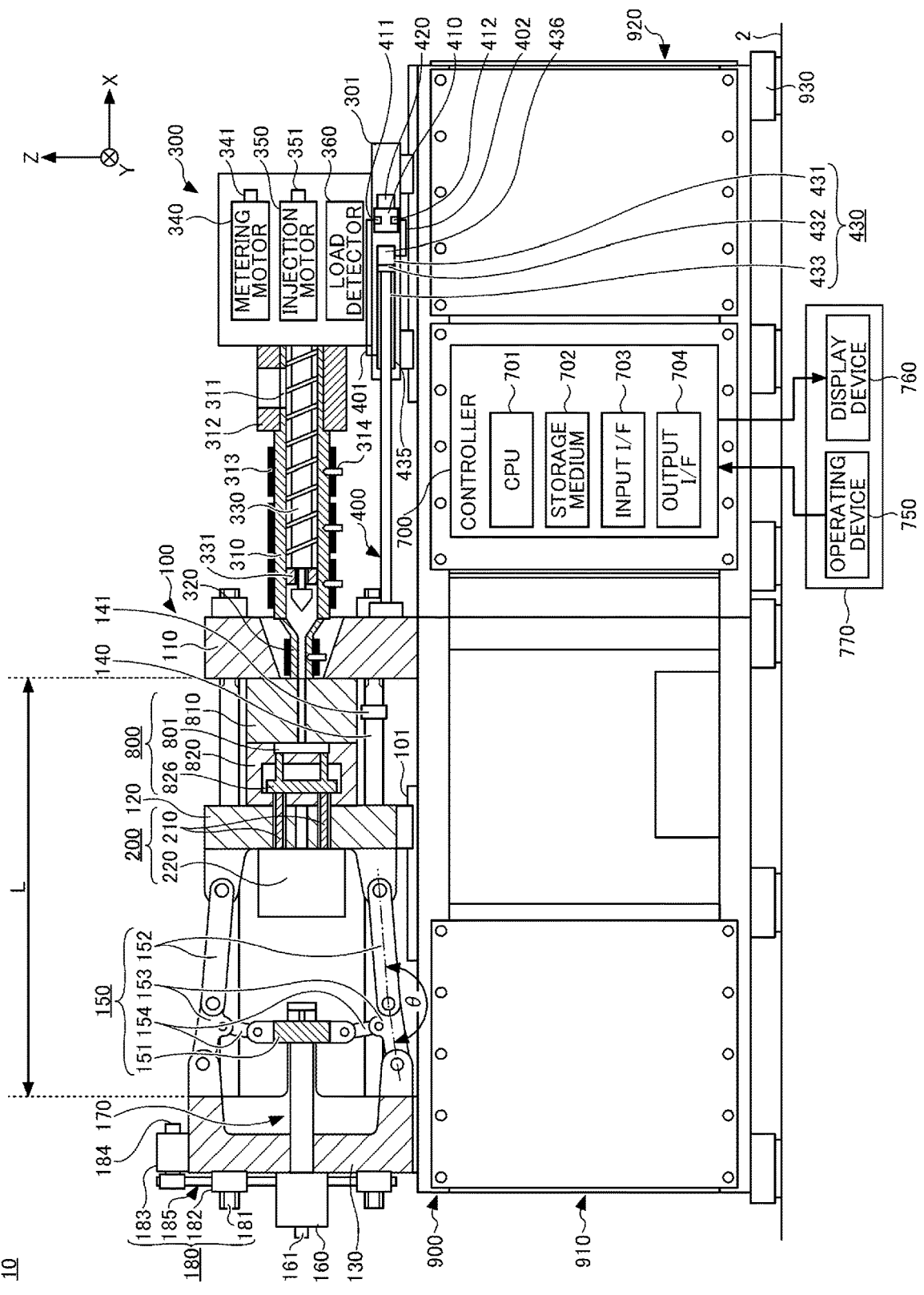
FIG. 2 is a diagram illustrating the state of the injection molding machine according to the embodiment during mold clamping.

FIG. 1 is a diagram illustrating the state of an injection molding machine according to an embodiment at the completion of mold opening. FIG. 2 is a diagram illustrating the state of the injection molding machine according to the embodiment during mold clamping. In this specification, the X-axis direction, the Y-axis direction, and the Z-axis direction are perpendicular to each other. The X-axis direction and the Y-axis direction represent horizontal directions, and the Z-axis direction represents a vertical direction. When a mold clamping unit 100 is a horizontal type, the X-axis direction is a mold opening/closing direction, and the Y-axis direction is a widthwise direction of an injection molding machine 10. The negative side in the Y-axis direction is referred to as "operation side", and the positive side in the Y-axis direction is referred to as "non-operation side."

As illustrated in FIGS. 1 and 2, the injection molding machine 10 includes the mold clamping unit 100 that opens and closes a mold unit 800, an ejector unit 200 that ejects a molding product molded in the mold unit 800, an injection unit 300 that injects a molding material into the mold unit 800, a movement unit 400 that moves the injection unit 300 toward and away from the mold unit 800, a controller (control unit) 700 that controls the components of the injection molding machine 10, and a frame 900 that supports the components of the injection molding machine 10. The frame 900 includes a mold clamping unit frame 910 that supports the mold clamping unit 100 and an injection unit frame 920 that supports the injection unit 300. Each of the mold clamping unit frame 910 and the injection unit frame 920 is installed on a floor 2 via a leveling adjuster 930. The controller 700 is placed in the internal space of the injection unit frame 920. Each component of the injection molding machine 10 is described below.

[Mold Clamping Unit]

In the description of the mold clamping unit 100, the direction of movement of a movable platen 120 during mold closing (for example, the positive X-axis direction) is referred to as "forward direction", and the direction of movement of the movable platen 120 during mold opening (for example, the negative X-axis direction) is referred to as "backward direction."

The mold clamping unit 100 closes, pressurizes, clamps, depressurizes, and opens the mold unit 800. The mold unit 800 includes a stationary mold 810 and a movable mold 820.

The mold clamping unit 100 is, for example, a horizontal type, and the mold opening and closing directions are horizontal directions. The mold clamping unit 100 includes a stationary platen 110 to which the stationary mold 810 is attached, the movable platen 120 to which the movable mold 820 is attached, and a movement mechanism 102 that moves the movable platen 120 in the mold opening and closing directions relative to the stationary platen 110.

The stationary platen 110 is fixed to the mold clamping unit frame 910. The stationary mold 810 is attached to a surface of the stationary platen 110 that faces the movable platen 120.

The movable platen 120 is placed to be movable in the mold opening and closing directions relative to the mold clamping unit frame 910. A guide 101 that guides the movable platen 120 is laid on the mold clamping unit frame 910. The movable mold 820 is attached to a surface of the movable platen 120 that faces the stationary platen 110.

The movement mechanism 102 moves the movable platen 120 toward and away from the stationary platen 110 to close, pressurize, clamp, depressurize, and open the mold unit 800. The movement mechanism 102 includes a toggle support 130 spaced apart from the stationary platen 110, a tie bar 140 connecting the stationary platen 110 and the toggle support 130, a toggle mechanism 150 that moves the movable platen 120 in the mold opening and closing directions relative to the toggle support 130, a mold clamping motor 160 that actuates the toggle mechanism 150, a motion conversion mechanism 170 that converts the rotary motion of the mold clamping motor 160 into linear motion, and a mold thickness adjustment mechanism 180 that adjusts the interval between the stationary platen 110 and the toggle support 130.

The toggle support 130 is spaced apart from the stationary platen 110 and is placed on the mold clamping unit frame 910 to be movable in the mold opening and closing directions. The toggle support 130 may be placed to be movable along a guide laid on the mold clamping unit frame 910. The guide 101 of the movable platen 120 may also serve as the guide of the toggle support 130.

According to this embodiment, the stationary platen 110 is fixed to the mold clamping unit frame 910 and the toggle support 130 is placed to be movable in the mold opening and closing directions relative to the mold clamping unit frame 910. However, the toggle support 130 may be fixed to the mold clamping unit frame 910 and the stationary platen 110 may be placed to be movable in the mold opening and closing directions relative to the mold clamping unit frame 910.

The tie bar 140 connects the stationary platen 110 and the toggle support 130 with an interval (distance) L therebetween in the mold opening and closing directions. Multiple (for example, four) tie bars may be used as the tie bar 140. The multiple tie bars 140 are placed parallel to the mold opening and closing directions and extend according to a mold clamping force. At least one tie bar 140 among the multiple tie bars 140 may be provided with a tie bar strain detector 141 that detects the strain of the tie bar 140. The tie bar strain detector 141 transmits a signal indicating its detection result to the controller 700. The detection result of the tie bar strain detector 141 is used to detect the mold clamping force.

According to this embodiment, the tie bar strain detector 141 is used as a mold clamping force detector to detect a mold clamping force. The present invention, however, is not limited to this configuration. The mold clamping force detector is not limited to a strain gauge type and may be a piezoelectric type, a capacitive type, a hydraulic type, an electromagnetic type, or the like, and its attachment position is not limited to the tie bar 140.

The toggle mechanism 150 is placed between the movable platen 120 and the toggle support 130, and moves the movable platen 120 in the mold opening and closing directions relative to the toggle support 130. The toggle mechanism 150 includes a crosshead 151 that moves in the mold opening and closing directions and a pair of link groups that are extended and contracted by the movement of the crosshead 151. Each link group includes a first link 152 and a second link 153 that are extendably and contractibly connected by a pin or the like. The first link 152 is pivotally attached to the movable platen 120 with a pin or the like. The second link 153 is pivotally attached to the toggle support 130 with a pin or the like. The second link 153 is attached to the crosshead 151 via a third link 154. The crosshead 151 is moved toward or away from the toggle support 130 to contract or extend the first link 152 and the second link 153 to move the movable platen 120 toward or away from the toggle support 130.

The configuration of the toggle mechanism 150 is not limited to the configuration illustrated in FIGS. 1 and 2. For example, the number of nodes of each link group, which is five in FIGS. 1 and 2, may be four, and one end of the third link 154 may be connected to the node of the first link 152 and the second link 153.

The mold clamping motor 160 is attached to the toggle support 130 to actuate the toggle mechanism 150. The mold clamping motor 160 moves the crosshead 151 toward or away from the toggle support 130 to contract or extend the first link 152 and the second link 153 to move the movable platen 120 toward or away from the toggle support 130. The mold clamping motor 160, which is directly connected to the motion conversion mechanism 170, may alternatively be connected to the motion conversion mechanism 170 via a belt or pulley.

The motion conversion mechanism 170 converts the rotary motion of the mold clamping motor 160 into the linear motion of the crosshead 151. The motion conversion mechanism 170 includes a threaded shaft and a threaded nut that mates with the threaded shaft. Balls or rollers may be interposed between the threaded shaft and the threaded nut.

The mold clamping unit 100 executes a mold closing process, a pressurizing process, a mold clamping process, a depressurizing process, and a mold opening process under the control of the controller 700.

In the mold closing process, the mold clamping motor 160 is driven to move the crosshead 151 forward to a mold closing completion position at a set travel speed to move the movable platen 120 forward to cause the movable mold 820 to touch the stationary mold 810. The position and travel speed of the crosshead 151 are detected using a mold clamping motor encoder 161, for example. The mold clamping motor encoder 161 detects the rotation of the mold clamping motor 160 and transmits a signal indicating the result of the detection to the controller 700.

A crosshead position detector that detects the position of the crosshead 151 and a crosshead travel speed detector that detects the travel speed of the crosshead 151 are not limited to the mold clamping motor encoder 161 and common ones may be employed. Furthermore, a movable platen position detector that detects the position of the movable platen 120 and a movable platen travel speed detector that detects the travel speed of the movable platen 120 are not limited to the mold clamping motor encoder 161 and common ones may be employed.

In the pressurizing process, the mold clamping motor 160 is further driven to further move the crosshead 151 from the mold closing completion position to a mold clamping position, thereby generating a mold clamping force.

In the mold clamping process, the mold clamping motor 160 is driven to maintain the position of the crosshead 151 at the mold clamping position. In the mold clamping process, the mold clamping force generated in the pressurizing process is maintained. In the mold clamping process, a cavity space 801 (see FIG. 2) is formed between the movable mold 820 and the stationary mold 810, and the injection unit 300 fills the cavity space 801 with a liquid molding material. The molding material is solidified, so that a molding product is obtained.

The number of cavity spaces 801 may be one or more. In the latter case, multiple molding products are simultaneously obtained. An insert material may be placed in part of the cavity space 801 and the molding material may fill another part of the cavity space 801. A molding product into which the insert material and the molding material are integrated is obtained.

In the depressurizing process, the mold clamping motor 160 is driven to move the crosshead 151 backward from the mold clamping position to a mold opening start position to move the movable platen 120 backward to reduce the mold clamping force. The mold opening start position and the mold closing completion position may be the same position.

In the mold opening process, the mold clamping motor 160 is driven to move the crosshead 151 backward from the mold opening start position to a mold opening completion position at a set travel speed to move the movable platen 120 backward to separate the movable mold 820 from the stationary mold 810. Thereafter, the ejector unit 200 ejects the molding product from the movable mold 820.

Set conditions in the mold closing process, the pressurizing process, and the mold clamping process are collectively set as a series of set conditions. For example, the travel speed and positions (including a mold closing start position, a travel speed switch position, the mold closing completion position, and the mold clamping position) of the crosshead 151 and the mold clamping force in the mold closing process and the pressurizing process are collectively set as a series of set conditions. The mold closing start position, the travel speed switch position, the mold closing completion position, and the mold clamping position, which are arranged in this order in the forward direction from the back side, represent the start points and end points of sections for which the travel speed is set. The travel speed is set section by section. There may be one or more travel speed switch positions. The travel speed switch position may not be set. Only one of the mold clamping position and the mold clamping force may be set.

Setting conditions in the depressurizing process and the mold opening process are likewise set. For example, the travel speed and positions (the mold opening start position, the travel speed switch position, and the mold opening completion position) of the crosshead 151 in the depressurizing process and the mold opening process are collectively set as a series of set conditions. The mold opening start position, the travel speed switch position, and the mold opening completion position, which are arranged in this order in the backward direction from the front side, represent the start points and end points of sections for which the travel speed is set. The travel speed is set section by section. There may be one or more travel speed switch positions. The travel speed switch position may not be set. The mold opening start position and the mold closing completion position may be the same position. The mold opening completion position and the mold closing start position may be the same position.

Instead of the travel speed, position, etc., of the crosshead 151, the travel speed, position, etc., of the movable platen 120 may be set. Furthermore, instead of the crosshead position (for example, the mold clamping position) or the movable platen position, the mold clamping force may be set.

The toggle mechanism 150 amplifies the driving force of the mold clamping motor 160 and transmits the amplified driving force to the movable platen 120. The amplification factor is also referred to as "toggle multiplying factor." The toggle multiplying factor changes according to the angle θ formed by the first link 152 and the second link 153 (hereinafter also referred to as "link angle θ"). The link angle θ is determined from the position of the crosshead 151. The toggle multiplying factor is maximized when the link angle θ is 180°.

When there is a change in the thickness of the mold unit 800 because of the replacement of the mold unit 800 or a change in the temperature of the mold unit 800, the mold thickness is adjusted to obtain a predetermined mold clamping force at the time of mold clamping. In adjusting the mold thickness, for example, an interval L between the stationary platen 110 and the toggle support 130 is adjusted so that the link angle θ of the toggle mechanism 150 becomes a predetermined angle at the time of mold touch when the movable mold 820 touches the stationary mold 810.

The mold clamping unit 100 includes a mold thickness adjustment mechanism 180. The mold thickness adjustment mechanism 180 adjusts the mold thickness by adjusting the interval L between the stationary platen 110 and the toggle support 130. The mold thickness is adjusted between the end of a molding cycle and the start of the next molding cycle, for example. The mold thickness adjustment mechanism 180 includes, for example, a threaded shaft 181 formed at the rear end of each tie bar 140, a threaded nut 182 held on the toggle support 130 in such a manner as to be rotatable and impossible to move forward or backward, and a mold thickness adjustment motor 183 that rotates the threaded nut 182 mating with the threaded shaft 181.

The threaded shaft 181 and the threaded nut 182 are provided for each tie bar 140. The rotational driving force of the mold thickness adjustment motor 183 may be transmitted to the multiple threaded nuts 182 via a rotational driving force transmission part 185. It is possible to synchronously rotate the multiple threaded nuts 182. The multiple threaded nuts 182 may be individually rotated by changing the transmission channel of the rotational driving force transmission part 185.

The rotational driving force transmission part 185 is constituted of, for example, gears. In this case, a driven gear is formed on the periphery of each threaded nut 182, a drive gear is attached to the output shaft of the mold thickness adjustment motor 183, and an intermediate gear that meshes with the driven gears and the drive gear is rotatably held in the center of the toggle support 130. The rotational driving force transmission part 185 may be constituted of a belt and pulleys instead of gears.

The operation of the mold thickness adjustment mechanism 180 is controlled by the controller 700. The controller 700 drives the mold thickness adjustment motor 183 to rotate the threaded nuts 182. As a result, the position of the toggle support 130 relative to the tie bars 140 is adjusted, and the interval L between the stationary platen 110 and the toggle support 130 is adjusted. Multiple mold thickness adjustment mechanisms may be used in combination.

The interval L is detected using a mold thickness adjustment motor encoder 184. The mold thickness adjustment motor encoder 184 detects the amount of rotation and the direction of rotation of the mold thickness adjustment motor 183, and transmits a signal indicating the detection results to the controller 700. The detection results of the mold thickness adjustment motor encoder 184 are used to monitor and control the position of the toggle support 130 and the interval L. A toggle support position detector that detects the position of the toggle support 130 and an interval detector that detects the interval L are not limited to the mold thickness adjustment motor encoder 184 and common ones may be employed.

The mold clamping unit 100 may include a mold temperature controller that controls the temperature of the mold unit 800. The mold unit 800 contains a flow path for a temperature control medium. The mold temperature controller controls the temperature of the mold unit 800 by controlling the temperature of the temperature control medium supplied to the flow path of the mold unit 800.

The mold clamping unit 100, which is a horizontal type whose mold opening and closing directions are horizontal directions according to this embodiment, may also be a vertical type whose mold opening and closing directions are vertical directions.

The mold clamping unit 100, which includes the mold clamping motor 160 as a drive source according to this embodiment, may also include a hydraulic cylinder instead of the mold clamping motor 160. Furthermore, the mold clamping unit unit 100 may include a linear motor for mold opening and closing and may include an electromagnet for mold clamping.

[Ejector Unit]

In the description of the ejector unit 200, the same as in the description of the mold clamping unit 100, the direction of movement of the movable platen 120 during mold closing (for example, the positive X-axis direction) is referred to as "forward direction", and the direction of movement of the movable platen 120 during mold opening (for example, the negative X-axis direction) is referred to as "backward direction."

The ejector unit 200 is attached to the movable platen 120 and moves forward and backward together with the movable platen 120. The ejector unit 200 includes one or more ejector rods 210 that eject a molding product from the mold unit 800 and a drive mechanism 220 that moves the ejector rod 210 in the directions of movement (the X-axis direction) of the movable platen 120.

Each ejector rod 210 is placed in a through hole of the movable platen 120 to be movable forward and backward. The front end of the ejector rod 210 contacts an ejector plate 826 of the movable mold 820. The front end of the ejector rod 210 may be either connected to or disconnected from the ejector plate 826.

The drive mechanism 220 includes, for example, an ejector motor and a motion conversion mechanism that converts the rotary motion of the ejector motor into the linear motion of the ejector rod 210. The motion conversion mechanism includes a threaded shaft and a threaded nut that mates with the threaded shaft. Balls or rollers may be interposed between the threaded shaft and the threaded nut.

The ejector unit 200 executes an ejection process under the control of the controller 700. In the ejection process, the ejector rods 210 are moved forward from a standby position to an ejection position at a set travel speed to move the ejector plate 826 forward to eject a molding product. Thereafter, the ejector motor is driven to move the ejector rods 210 backward at a set travel speed to move the ejector plate 826 backward to the initial standby position.

The position and travel speed of the ejector rods 210 are detected using an ejector motor encoder, for example. The ejector motor encoder detects the rotation of the ejector motor to transmit a signal indicating the detection results to the controller 700. An ejector rod position detector that detects the position of the ejector rods 210 and an ejector rod travel speed detector that detects the travel speed of the ejector rods 210 are not limited to the ejector motor encoder and common ones may be employed.

[Injection Unit]

Unlike in the description of the mold clamping unit 100 and the ejector unit 200, in the description of the injection unit 300, the direction of movement of a screw 330 during filling (for example, the negative X-axis direction) is referred to as "forward direction", and the direction of movement of the screw 330 during metering (for example, the positive X-axis direction) is referred to as "backward direction."

The injection unit 300 is installed on a slidable base 301, and the slidable base 301 is so placed on the injection unit frame 920 as to be movable forward and backward relative to the injection unit frame 920. The injection unit 300 is so placed as to be movable toward and away from the mold unit 800. The injection unit 300 touches the mold unit 800 to fill the cavity space 801 within the mold unit 800 with a molding material metered in a cylinder 310. The injection unit 300 includes, for example, the cylinder 310 that heats a molding material, a nozzle 320 provided at the front end of the cylinder 310, the screw 330 so placed in the cylinder 310 as to be movable forward and backward and rotatable, a metering motor 340 that rotates the screw 330, an injection motor 350 that moves the screw 330 forward and backward, and a load detector 360 that detects a load transmitted between the injection motor 350 and the screw 330.

The cylinder 310 (an example of a temperature-controlled member) heats a molding material supplied to the inside through a supply port 311. Examples of molding materials include resin. The molding material is formed into pellets, for example, and is supplied to the supply port 311 in a solid state. The supply port 311 is formed in a rear portion of the cylinder 310. A cooler 312 such as a water-cooled cylinder is provided on the outer cylindrical surface of the rear portion of the cylinder 310. A heater 313 such as a band heater and a temperature detector 314 are provided forward of the cooler 312 on the outer cylindrical surface of the cylinder 310.

The cylinder 310 is divided into multiple zones in the axial direction (for example, the X-axis direction) of the cylinder 310. Each zone is provided with the heater (an example of a heating part) 313 and the temperature detector (an example of a detection part) 314. A temperature is set for each zone and the controller 700 controls the heater 313 so that the temperature detected by the temperature detector 314 equals the set temperature.

The nozzle 320 is provided at the front end of the cylinder 310 to be pressed against the mold unit 800. The heater 313 and the temperature detector 314 are provided on the periphery of the nozzle 320. The controller 700 controls the heater 313 so that the detected temperature of the nozzle 320 equals a set temperature.

The screw 330 is placed in the cylinder 310 to be rotatable and movable forward and backward. When the screw 330 rotates, a molding material is fed forward along the helical groove of the screw 330. The molding material is gradually melted by heat from the cylinder 310 as the molding material is fed forward. As the molding material in liquid form is fed forward on the screw 330 to be accumulated in the front of the cylinder 310, the screw 330 is moved backward. Thereafter, when the screw 330 is moved forward, the molding material in liquid form accumulated in front of the screw 330 is injected into the mold unit 800 through the nozzle 320.

A backflow prevention ring 331 is so attached to a front portion of the screw 330 as to be movable forward and backward as a backflow check valve that prevents the backflow of the molding material from the front to the back of the screw 330 when the screw 330 is pushed forward.

When the screw 330 is moved forward, the backflow prevention ring 331 is pushed backward by the pressure of the molding material in front of the screw 330 to move backward relative to the screw 330 to a closing position that closes the flow channel of the molding material (see FIG. 2), thereby preventing the backflow of the molding material accumulated in front of the screw 330 in the backward direction.

When the screw 330 is rotated, the backflow prevention ring 331 is pushed forward by the pressure of the molding material fed forward along the helical groove of the screw 330 to move forward relative to the screw 330 to an open position (see FIG. 1) that opens the flow channel of the molding material. As a result, the molding material is fed forward of the screw 330.

The backflow prevention ring 331 may be either a co-rotating type that rotates together with the screw 330 or a non-co-rotating type that does not rotate together with the screw 330.

The injection unit 300 may include a drive source that moves the backflow prevention ring 331 forward and backward between the open position and the closing position relative to the screw 330.

The metering motor 340 rotates the screw 330. The drive source that rotates the screw 330 is not limited to the metering motor 340 and may be, for example, a hydraulic pump.

The injection motor 350 moves the screw 330 forward and backward. A motion conversion mechanism that converts the rotary motion of the injection motor 350 into the linear motion of the screw 330, etc., are provided between the injection motor 350 and the screw 330. The motion conversion mechanism includes, for example, a threaded shaft and a threaded nut that mates with the threaded shaft. Balls or rollers may be provided between the threaded shaft and the threaded nut. The drive source that moves the screw 330 forward and backward is not limited to the injection motor 350, and may be, for example, a hydraulic cylinder.

The load detector 360 detects a load transmitted between the injection motor 350 and the screw 330. The detected load is converted into pressure in the controller 700. The load detector 360 is provided in the load transmission path between the injection motor 350 and the screw 330 to detect a load applied to the load detector 360.

The load detector 360 transmits a signal of the detected load to the controller 700. The load detected by the load detector 360 is converted into pressure applied between the screw 330 and the molding material, and is used to control and monitor a pressure that the screw 330 receives from the molding material, a back pressure against the screw 330, a pressure applied from the screw 330 to the molding material, etc.

A pressure detector that detects the pressure of a molding material is not limited to the load detector 360 and a common one may be employed. For example, a nozzle pressure sensor or a cavity pressure sensor may be employed. The nozzle pressure sensor is placed in the nozzle 320. The cavity pressure sensor is placed within the mold unit 800.

The injection unit 300 executes processes such as a metering process, a filling process, and a dwelling process under the control of the controller 700. The filling process and the dwelling process may be collectively referred to as "injection process."

In the metering process, the metering motor 340 is driven to rotate the screw 330 at a set rotational speed to feed a molding material forward along the helical groove of the screw 330. With this, the molding material is gradually melted. As the molding material in liquid form is fed forward of the screw 330 to be accumulated in the front portion of the cylinder 310, the screw 330 is moved backward. The rotational speed of the screw 330 is detected using a metering motor encoder 341, for example. The metering motor encoder 341 detects the rotation of the metering motor 340 and transmits a signal indicating the detection result to the controller 700. A screw rotational speed detector that detects the rotational speed of the screw 330 is not limited to the metering motor encoder 341 and a common one may be employed.

In the metering process, in order to restrict a sudden backward movement of the screw 330, the injection motor 350 may be driven to apply a set back pressure to the screw 330. The back pressure to the screw 330 is detected using the load detector 360, for example. When the screw 330 is moved backward to a metering completion position and a predetermined amount of molding material is accumulated in front of the screw 330, the metering process is completed.

The position and rotational speed of the screw 330 in the metering process are collectively set as a series of set conditions. For example, a metering start position, a rotational speed switch position, and the metering completion position are set. These positions, which are arranged in this order in the backward direction from the front side, represent the start points and end points of sections for which the rotational speed is set. The rotational speed is set section by section. There may be one or more rotational speed switch positions. The rotational speed switch position may not be set. Furthermore, a back pressure is set for each section.

In the filling process, the injection motor 350 is driven to move the screw 330 forward at a set travel speed to fill the cavity space 801 within the mold unit 800 with the molding material in liquid form accumulated in front of the screw 330. The position and travel speed of the screw 330 are detected using an injection motor encoder 351, for example. The injection motor encoder 351 detects the rotation of the injection motor 350 and transmits a signal indicating the detection results to the controller 700. When the position of the screw 330 reaches a set position, the filling process switches to the dwelling process (so-called V/P switchover). The position at which V/P switchover occurs may be referred to as "V/P switchover position." The set travel speed of the screw 330 may be changed according to the position of the screw 330, time, etc.

The position and travel speed of the screw 330 in the filling process are collectively set as a series of set conditions. For example, a filling start position (also referred to as "injection start position"), a travel speed switch position, and the V/P switchover position are set. These positions, which are arranged in this order in the forward direction from the back side, represent the start points and end points of sections for which the travel speed is set. The travel speed is set section by section. There may be one or more travel speed switch positions. The travel speed switch position may not be set.

The upper limit value of the pressure of the screw 330 is set for each section for which the travel speed of the screw 330 is set. The pressure of the screw 330 is set by the load detector 360. When the pressure of the screw 330 is less than or equal to a set pressure, the screw 330 is moved forward at a set travel speed. When the pressure of the screw 330 exceeds the set pressure, the screw 330 is moved forward at a travel speed lower than the set travel speed so that the pressure of the screw 330 is less than or equal to the set pressure, for mold protection.

In the filling process, after the position of the screw 330 reaches the V/P switchover position, the screw 330 may be temporarily stopped at the V/P switchover position and the V/P switchover may be thereafter performed. Immediately before the V/P switchover, the screw 330 may be moved forward or backward very slowly instead of being stopped. A screw position detector that detects the position of the screw 330 and a screw travel speed detector that detects the travel speed of the screw 330 are not limited to the injection motor encoder 351 and common ones may be employed.

In the dwelling process, the injection motor 350 is driven to push the screw 330 forward to hold the pressure of the molding material at the front end of the screw 330 (hereinafter also referred to as "dwell pressure") at a set pressure and press the molding material remaining in the cylinder 310 toward the mold unit 800. It is possible to compensate for a shortage of molding material due to cooling contracture within the mold unit 800. The dwell pressure is detected using the load detector 360, for example. The set value of the dwell pressure may be changed according to elapsed time from the start of the dwelling process, etc. Two or more values may be set for each of the dwell pressure and the dwell time for holding the dwell pressure in the dwelling process, and the dwell pressure and the dwell time may be collectively set as a series of set conditions.

In the dwelling process, the molding material in the cavity space 801 within the mold unit 800 is gradually cooled, so that the entrance of the cavity space 801 is filled up with the solidified molding material when the dwelling process is completed. This state, which is referred to as "gate seal," prevents the backflow of the molding material from the cavity space 801. After the dwelling process, the cooling process is started. In the cooling process, the molding material in the cavity space 801 is solidified. The metering process may be executed during the cooling process in order to reduce molding cycle time.

The injection unit 300, which is an in-line screw type according to this embodiment, may be a screw preplasticizing type. According to the screw preplasticizing injection unit, a molding material melted in a plasticizing cylinder is supplied to an injection cylinder, and the molding material is injected into a mold unit from the injection cylinder. In the plasticizing cylinder, a screw is so placed as to be rotatable and immovable forward or backward or a screw is so placed as to be rotatable and movable forward and backward. In the injection cylinder, a plunger is so placed as to be movable forward and backward.

Furthermore, the injection unit 300, which is a horizontal type where the axial direction of the cylinder 310 is a horizontal direction according to this embodiment, may be a vertical type where the axial direction of the cylinder 310 is a vertical direction. A mold clamping unit combined with the injection unit 300 of a vertical type may be either a horizontal type or a vertical type. Likewise, a mold clamping unit combined with the injection unit 300 of a horizontal type may be either a horizontal type or a vertical type.

[Movement Unit]

In the description of the movement unit 400, the same as in the description of the injection unit 300, the direction of movement of the screw 330 during filling (for example, the negative X-axis direction) is referred to as "forward direction", and the direction of movement of the screw 330 during metering (for example, the positive X-axis direction) is referred to as "backward direction."

The movement unit 400 moves the injection unit 300 toward and away from the mold unit 800. Furthermore, the movement unit 400 presses the nozzle 320 against the mold unit 800 to generate a nozzle touch pressure. The movement unit 400 includes a hydraulic pump 410, a motor 420 serving as a drive source, and a hydraulic cylinder 430 serving as a hydraulic actuator.

The hydraulic pump 410 includes a first port 411 and a second port 412. The hydraulic pump 410, which is a bidirectionally rotatable pump, switches the rotational direction of the motor 420 to take in hydraulic fluid (for example, oil) from one of the first port 411 and the second port 412 and discharge hydraulic fluid from the other of the first port 411 and the second port 412, thereby generating hydraulic pressure. The hydraulic pump 410 may take in hydraulic fluid from a tank and discharge hydraulic fluid from one of the first port 411 and the second port 412.

The motor 420 causes the hydraulic pump 410 to operate. The motor 420 drives the hydraulic pump 410 with a rotational direction and a rotation torque corresponding to a control signal from the controller 700. The motor 420 may be an electric motor and may be an electric servo motor.

The hydraulic cylinder 430 includes a cylinder body 431, a piston 432, and a piston rod 433. The cylinder body 431 is fixed to the injection unit 300. The piston 432 separates the inside of the cylinder body 431 into a front chamber 435 serving as a first chamber and a rear chamber 436 serving as a second chamber. The piston rod 433 is fixed to the stationary platen 110.

The front chamber 435 of the hydraulic cylinder 430 is connected to the first port 411 of the hydraulic pump 410 via a first flow channel 401. Hydraulic fluid discharged from the first port 411 is supplied to the front chamber 435 via the first flow channel 401 to push the injection unit 300 forward. The injection unit 300 is moved forward to press the nozzle 320 against the stationary mold 810. The front chamber 435 serves as a pressure chamber that generates the nozzle touch pressure of the nozzle 320 with the pressure of the hydraulic fluid supplied from the hydraulic pump 410.

The rear chamber 436 of the hydraulic cylinder 430 is connected to the second port 412 of the hydraulic pump 410 via a second flow channel 402. Hydraulic fluid discharged from the second port 412 is supplied to the rear chamber 436 of the hydraulic cylinder 430 via the second flow channel 402 to push the injection unit 300 backward. The injection unit 300 is moved backward to separate the nozzle 320 from the stationary mold 810.

According to this embodiment, the movement unit 400 includes the hydraulic cylinder 430. The present invention, however, is not limited to this. For example, instead of the hydraulic cylinder 430, an electric motor and a motion conversion mechanism that converts the rotary motion of the electric motor into the linear motion of the injection unit 300 may be employed.

[Controller]

The controller 700, which is composed of, for example, a computer, includes a central processing unit (CPU) 701, a storage medium 702 such as a memory, an input interface (I/F) 703, and an output interface (I/F) 704 as illustrated in FIGS. 1 and 2. The controller 700 executes various controls by causing the CPU 701 to execute one or more programs stored in the storage medium 702. Furthermore, the controller 700 receives an external signal at the input interface 703 and transmits a signal to the outside at the output interface 704.

The controller 700 repeatedly manufacture a molding product by repeatedly executing processes such as the metering process, the mold closing process, the pressurizing process, the mold clamping process, the filling process, the dwelling process, the cooling process, the depressurizing process, the mold opening process, and the ejection process. A series of operations for obtaining a molding product, for example, operations from the start of a metering process and the start of the next metering process, may be referred to as "shot" or "molding cycle." Furthermore, time required for one shot may be referred to as "molding cycle time" or "cycle time."

One molding cycle has, for example, the metering process, the mold closing process, the pressurizing process, the mold clamping process, the filling process, the dwelling process, the cooling process, the depressurizing process, the mold opening process, and the ejection process in this order. The order here is order in which the processes are started. The filling process, the dwelling process, and the cooling process are executed during the mold clamping process. The start of the mold clamping process may coincide with the start of the filling process. The completion of the depressurizing process coincides with the start of the mold opening process.

Multiple processes may be synchronously executed to reduce the molding cycle time. For example, the metering process may be executed during the cooling process of the previous molding cycle or may be executed during the mold clamping process. In this case, the mold closing process may be executed at the beginning of the molding cycle. Furthermore, the filling process may be started during the mold closing process. Furthermore, the ejection process may be started during the mold opening process. When an on-off valve that opens and closes the flow path of the nozzle 320 is provided, the mold opening process may be started during the metering process. This is because even when the mold opening process is started during the metering process, no molding material leaks from the nozzle 320 as long as the on-off valve closes the flow path of the nozzle 320.

One molding cycle may include one or more processes other than the metering process, the mold closing process, the pressurizing process, the mold clamping process, the filling process, the dwelling process, the cooling process, the depressurizing process, the mold opening process, and the ejection process.

For example, before the start of the metering process after the completion of the dwelling process, a pre-metering suck back process to move the screw 330 backward to a preset metering start position may be executed. This makes it possible to reduce the pressure of the molding material accumulated in front of the screw 330 before the start of the metering process and to prevent a sudden backward movement of the screw 330 at the start of the metering process.

Furthermore, before the start of the filling process after the completion of the metering process, a post-metering suck back process to move the screw 330 backward to a preset filling start position (also referred to as "injection start position") may be executed. This makes it possible to reduce the pressure of the molding material accumulated in front of the screw 330 before the start of the filling process and to prevent the leakage of the molding material from the nozzle 320 before the start of the filling process.

The controller 700 is connected to an operating device 750 that receives a user's input operation and a display device 760 that displays a screen. The operating device 750 and the display device 760 may be composed of, for example, a touchscreen 770 as a one-piece structure. The touchscreen 770 serving as the display device 760 displays a screen under the control of the controller 700. For example, information such as the settings of the injection molding machine 10 and the current condition of the injection molding machine 10 may be displayed in the screen of the touchscreen 770. Furthermore, for example, operation parts such as buttons and input fields for receiving a user's input operation and may be displayed in the screen of the touchscreen 770. The touchscreen 770 serving as the operating device 750 detects a user's input operation on the screen and outputs a signal according to the input operation to the controller 700. This enables the user to, for example, enter the settings (including setting values) for the injection molding machine 10 by operating the operation parts provided in the screen while checking information displayed on the screen. Furthermore, by operating the operation parts provided in the screen, the user can cause the injection molding machine 10 to perform operations corresponding to the operation parts. The operations of the injection molding machine 10 may be, for example, the operations (including stopping) of the mold clamping unit 100, the ejector unit 200, the injection unit 300, the movement unit 400, etc. Furthermore, the operations of the injection molding machine 10 may be the switching of the screen displayed on the touchscreen 770 serving as the display device 760, etc.

The operating device 750 and the display device 760 of this embodiment, which are described as being integrated into the touchscreen 770, may be separately provided. Furthermore, two or more operating devices 750 may be provided. The operating device 750 and the display device 760 are disposed on the operation side (the negative side in the Y-axis direction) of the mold clamping unit 100 (more specifically, the stationary platen 110).

Figure 3:
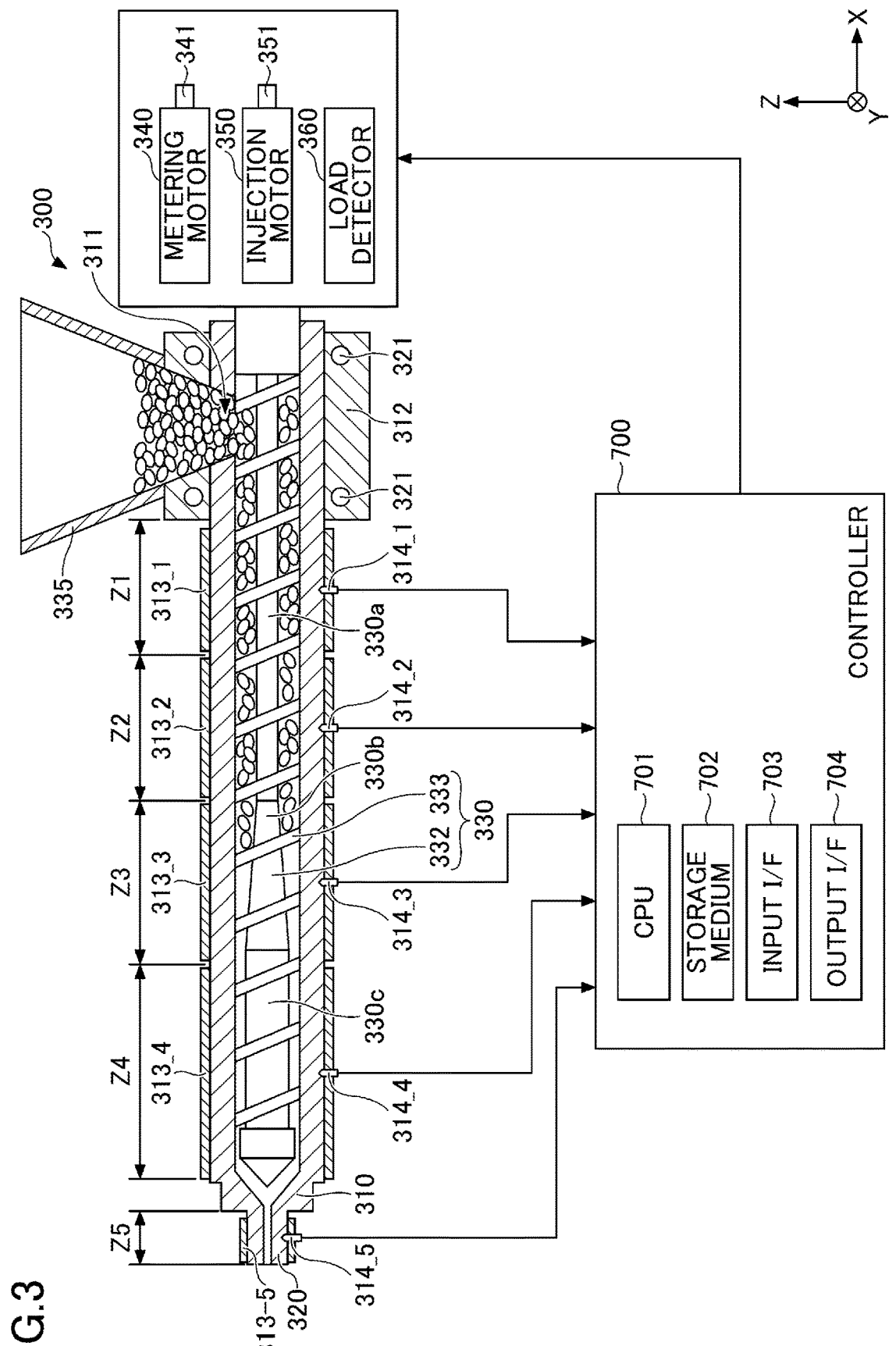
FIG. 3 is a diagram illustrating part of an injection unit of the injection molding machine according to the embodiment.

FIG. 3 is a diagram illustrating part of the injection unit 300 according to the embodiment. Referring to FIG. 3, the injection unit 300 according to the embodiment includes the cylinder 310 and the screw 330 that feeds resin in the cylinder 310. Furthermore, the injection unit 300 according to the embodiment includes five heaters 313_1 through 313_5 as the heater 313. The heaters 313_1 through 313_5 are separately provided one for each of multiple zones on the outer cylindrical surface of the cylinder 310.

The screw 330 includes a screw rotating shaft 332 and a flighting 333 helically provided around the screw rotating shaft 332 as a one-piece structure. When the screw 330 rotates, the flighting 333 of the screw 330 moves to feed resin pellets filling in the thread groove of the screw 330 forward.

The screw 330 is, for example, zoned into a supply part 330a, a compression part 330b, a metering part 330c from the back side (the side of a hopper 335) to the front side (toward the nozzle 320) along the axial direction. The supply part 330a receives resin pellets and conveys the received resin pellets forward. The compression part 330b melts the supplied resin while compressing the supplied resin. The metering part 330c is a part that meters the molten resin in fixed amounts. The depth of the thread groove of the screw 330 is larger in the supply part 330a, smaller in the metering part 330c, and decreases toward the front side in the compression part 330b. The configuration of the screw 330 is not limited in particular. For example, the depth of the thread groove of the screw 330 may be constant. This embodiment discusses the case where the length ratio of the supply part 330a, the compression part 330b, and the metering part 330c is approximately 50%, approximately, 25%, and approximately 25%. This length ratio is illustrated as an example and differs depending on the type of a molding material and the mode of implementation.

The injection molding machine 10 injects resin melted in the cylinder 310 into the cavity space 801 in the mold unit 800 through the nozzle 320. The mold unit 800 includes the stationary mold 810 and the movable mold 820, and the cavity space 801 is created between the stationary mold 810 and the movable mold 820 during mold clamping. The resin cooled and solidified in the cavity space 801 is extracted as a molding product after mold opening. Resin pellets serving as a molding material are supplied to the rear portion of the cylinder 310 from the hopper 335.

The supply port 311 is formed at a predetermined position in the cylinder 310, and the hopper 335 is connected to the supply port 311. The resin pellets in the hopper 335 are supplied into the cylinder 310 through the supply port 311.

The cylinder 310 is divided into six zones along the longitudinal direction up to the nozzle 320. According to this embodiment, the heater 313 is provided in five zones out of the six zones. Furthermore, temperature detectors 314_1 through 314_5 are provided one in each of the five zones.

According to this embodiment, the five zones are referred to as a first zone Z1, a second zone Z2, a third zone Z3, a fourth zone Z4, and a fifth zone Z5, which are arranged in this order with the first zone Z1 closest to the supply port 311. The first zone Z1 and the second zone Z2 are provided in the supply part 330a that receives resin pellets and conveys the received resin pellets forward. The third zone Z3 is provided in the compression part 330b that melts the supplied resin while compressing the supplied resin. The fourth zone Z4 is provided in the metering part 330c that meters the molten resin in fixed amounts. The fifth zone Z5 is provided in the vicinity of the nozzle 320. This embodiment illustrates the case where temperature control is performed with respect to each of the first through five zones Z1 through Z5. The present disclosure, however, is not limited to performing temperature control zone by zone as illustrated in this embodiment, and zones for temperature control may be determined according to the mode of implementation, for example, the length of the cylinder 310, a molding material, etc.

The cooler 312 is provided backward of the heaters 313_1 through 313_5 (in the vicinity of the supply port 311). The vicinity of the supply port 311 where the cooler 312 is provided increases in temperature because of heat transmitted from the first zone Z1. Therefore, under the control of the controller 700, the cooler 312 cools the rear portion of the cylinder 310 to maintain the temperature of the rear portion of the cylinder 310 at such a temperature as to prevent the melting of the surfaces of resin pellets, in order to prevent the bridging (agglomeration) of the resin pellets in the rear portion of the cylinder 310 or the hopper 335. The cooler 312 includes a flow channel 321 for a refrigerant such as water or air. The controller 700 controls the temperature by controlling a flow rate in the flow channel 321.

The heaters 313_1, 313_2, 313_3, 313_4 and 313_5 that are independently supplied with electric current are disposed on the outer cylindrical surface of the cylinder 310 in the first zone Z1, the second zone Z2, the third zone Z3, the fourth zone Z4, and the fifth zone Z5, respectively. For example, band heaters that externally heat the cylinder 310 are used as the heaters 313_1 through 313_5. The band heaters are so provided as to surround the outer cylindrical surface of the cylinder 310. In other words, the planar heaters 313_1 through 313_5 are attached to the outer cylindrical surface of the cylinder 310 in the first through fifth zones Z1 through Z5, respectively. By supplying electric current to the heaters 313_1 through 313_5, it is possible to heat and melt the resin pellets in the cylinder 310.

The heaters 313_1 through 313_5 are arranged along the longitudinal direction of the cylinder 310 to independently heat the first through fifth zones Z1 through Z5, respectively, into which the cylinder 310 is divided. The controller 700 performs feedback control on the heaters 313_1 through 313_5 so that the temperature of each of the zones Z1 through Z5 becomes a set temperature. The temperatures of the zones Z1 through Z5 are measured by the temperature detectors 314_1 through 314_5, respectively. The operation of the injection molding machine 10 is controlled by the controller 700.

Heat capacity differs from zone to zone in the cylinder 310. Therefore, when heat is applied using the heaters 313_1 through 313_5, the rate of temperature increase differs from zone to zone. Therefore, according to this embodiment, the controller 700 has a function to perform control to equalize the rates of temperature increase in the zones to make it possible to increase the temperature at the same rate in all of the zones.

In the injection molding machine 10 according to this embodiment, a target temperature for completing temperature increase is set zone by zone. The controller 700 can estimate the time required from the start to the completion of temperature increase based on the set target temperature and the controlled rate of temperature increase in each zone. According to this, the controller 700 of this embodiment starts increasing temperature the estimated required time before the time of completion of temperature increase in response to receiving a user's input of the time of completion of temperature increase. This makes it possible to perform such control as to complete temperature increase at the time of completion input by and received from the user. Next, the controller 700 is specifically described.

Figure 4:
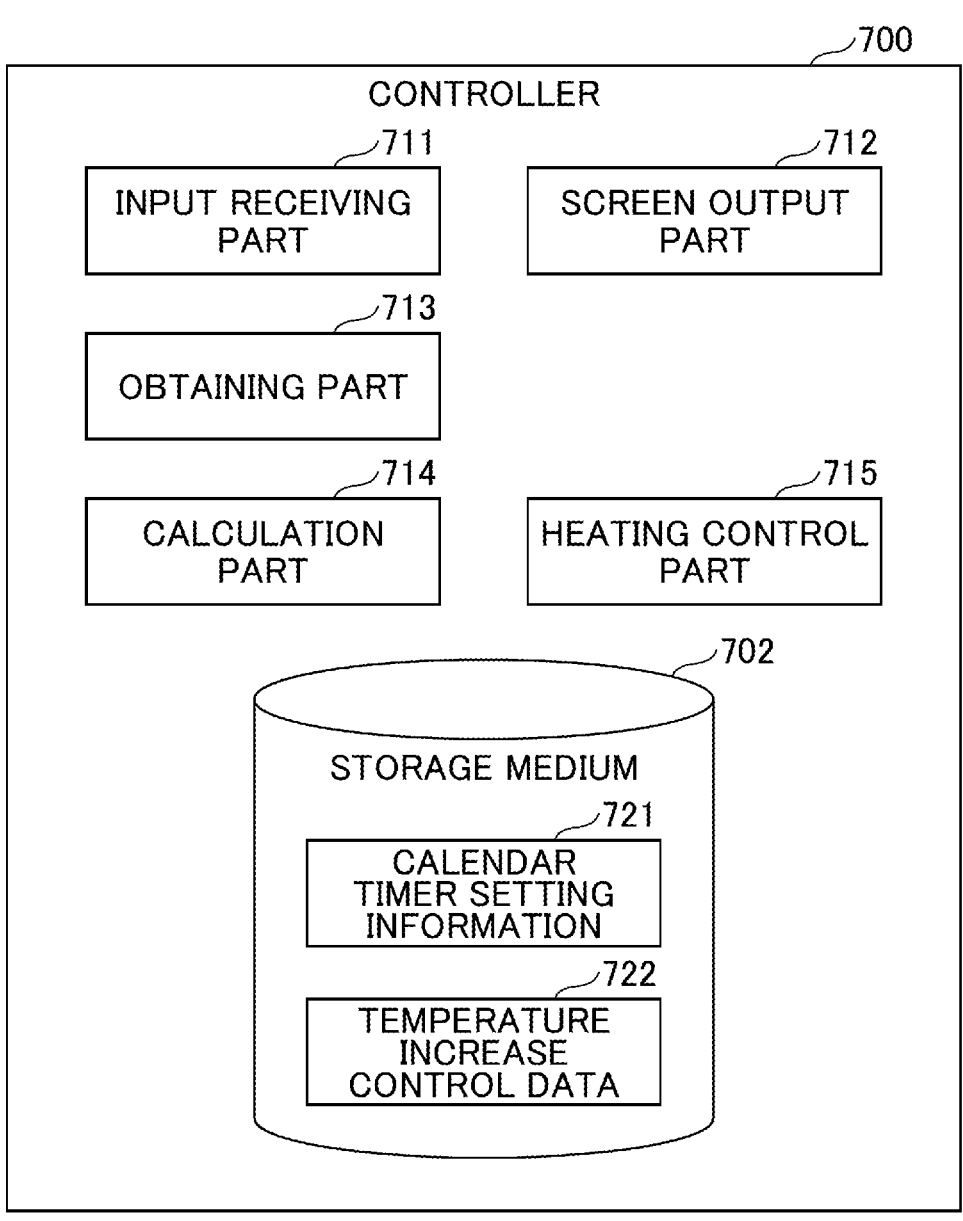
FIG. 4 is a functional block diagram of a controller according to the embodiment.

FIG. 4 is a functional block diagram of the controller 700 according to this embodiment. The functional blocks illustrated in FIG. 4 are conceptual and do not have to be physically configured as illustrated. All or some of the functional blocks may be functionally or physically distributed or integrated in desired units. Processing functions executed in the functional blocks are entirely or partly as desired executed by one or more programs executed in the CPU 701 (see FIGS. 1 and 2). Furthermore, the functional blocks may be implemented in hard wired logic. As illustrated in FIG. 4, the controller 700 includes an input receiving part 711 (a reception part), a screen output part 712 (an output part), an obtaining part 713, a calculation part 714, and a heating control part 715.

Furthermore, calendar timer setting information 721 and temperature increase control data 722 are stored in the storage medium 702 of the controller 700.

The calendar timer setting information 721 is information indicating settings for starting or completing the increasing of the temperature of the heaters 313_1 through 313_5 provided in the injection molding machine 10.

The temperature increase control data 722 are information for controlling temperature increase zone by zone. The details of the temperature increase control data 722 are described below.

The input receiving part 711 receives a user's input operation from the operating device 750 via the input interface 703.

The screen output part 712 outputs data such as a display screen to the display device 760. For example, when the input receiving part 711 receives an operation to display a calendar setting screen, the screen output part 712 reads the calendar timer setting information 721 from the storage medium 702 to output the calendar setting screen to the display device 760. This embodiment illustrates the case of outputting a display screen, etc., to the display device 760. This, however, does not limit the output destination of data to the display device 760. For example, the screen output part 712 may output data such as a display screen to an information processing apparatus connected via a network.

Figure 5:
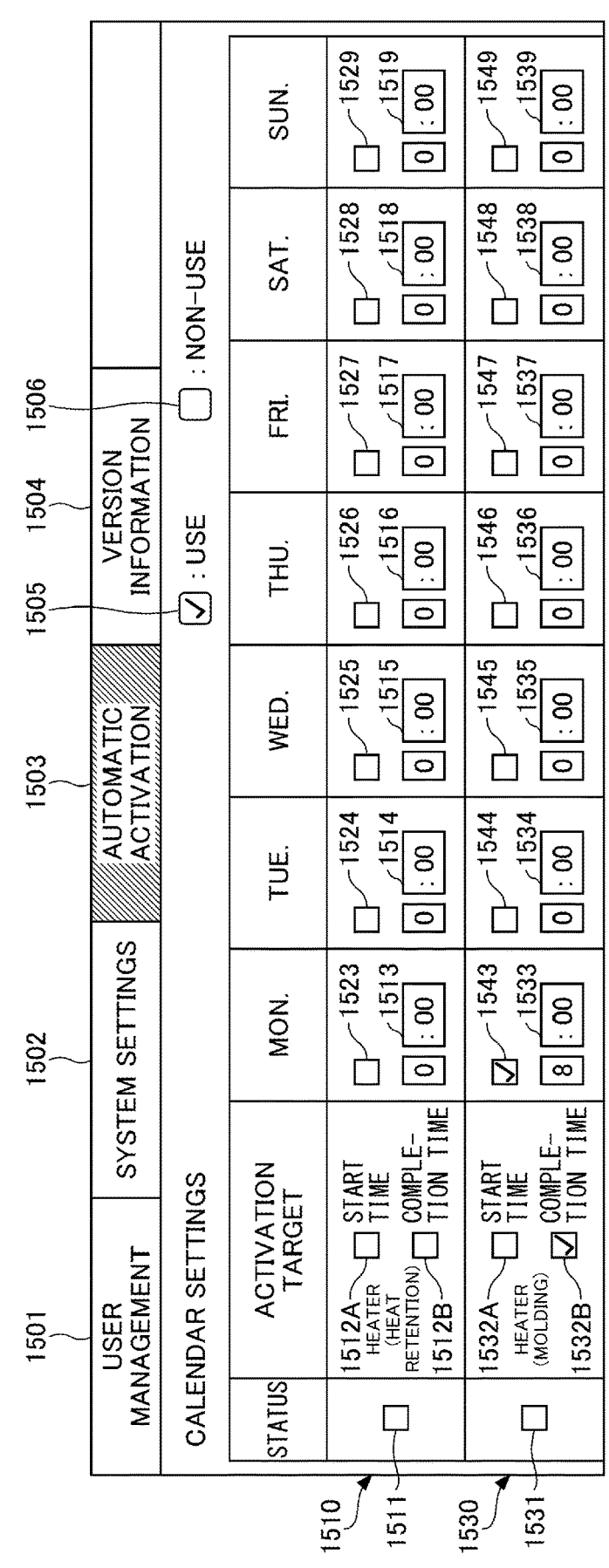
FIG. 5 is a diagram illustrating an example of a calendar setting screen output by a screen output part according to the embodiment.

FIG. 5 is a diagram illustrating an example of the calendar setting screen output by the screen output part 712 according to this embodiment.

As illustrated in FIG. 5, multiple tabs are arranged at the top of a display screen 1500. The display screen 1500 includes tabs such as user management 1501, system settings 1502, automatic activation 1503, and version information 1504. According to the example illustrated in FIG. 5, the automatic activation 1503 is selected.

According to the example illustrated in FIG. 5, the calendar setting screen is displayed based on the selection of the automatic activation 1503. The calendar setting screen includes a use box 1505 and a non-use box 1506. Furthermore, the calendar setting screen includes a heater (heat retention) row 1510 and a heater (molding) row 1530.

The use box 1505 and the non-use box 1506 are check boxes for setting whether to control temperature increase using the settings entered on the calendar setting screen.

The heater (heat retention) row 1510 shows settings for controlling temperature increase up to the heat retention target temperature of each zone of the cylinder 310 with respect to each day of the week. The heat retention target temperature is a target temperature set for the case where it is desired to reduce the time to molding compared with the case of normal temperature but molding is not immediately performed. The temperature may be increased up to the heat retention target temperature, for example, in the case of preparing peripherals of the injection molding machine 10, such as an extractor, during a lunch break, etc.

A status box 1511 includes a flag indicating whether to user the settings shown in the heater (heat retention) row 1510. A check (setting) in the status box 1511 indicates that the settings of the heater (heat retention) row 1510 are used.

In the heater (heat retention) row 1510, time entry fields fields 1513 through 1519 (examples of a second entry field) are shown one for each of the days of the week denoted by "Mon.," "Tue.," "Wed.," "Thu.," "Fri.," "Sat.," and "Sun." Furthermore, status boxes 1523 through 1529 are shown one for each day of the week. The status boxes 1523 through 1529 are check boxes for setting whether to control temperature increase according to the times entered in the time entry fields 1513 through 1519, respectively.

In the heater (heat retention) row 1510, a start time box 1512A and a completion time box 1512B are shown. The start time box 1512A is a check box for setting whether to use the times entered in the time entry fields 1513 through 1519 of the days of the week as the start time of temperature increase. The completion time box 1512B is a check box for setting whether to use the times entered in the time entry fields 1513 through 1519 of the days of the week as the completion time of temperature increase.

That is, in the case where the start time box 1512A is checked, the controller 700 starts to control heating with (heating performed by) the heaters 313_1 through 313_5 so that the temperature starts to increase at the time entered in each of the time entry fields 1513 through 1519 each day of the week. Thereafter, as soon as the heat retention target temperature set zone by zone is reached, the controller 700 completes the control of heating with the heaters 313_1 through 313_5.

In the case where the completion time box 1512B is checked, the controller 700 starts to control heating so that the temperature increase is completed at the time entered in each of the time entry fields 1513 through 1519 each day of the week. That is, the controller 700 performs control such that the control of heating with the heaters 313_1 through 313_5 starts at the time calculated backward so that the temperature increase is completed at the entered time, and that the heat retention target temperature set zone by zone is reached and the control of heating with the heaters 313_1 through 313_5 is completed at the entered time.

The heater (molding) row 1530 shows settings for controlling temperature increase up to the molding target temperature of each zone of the cylinder 310 with respect to each day of the week. The molding target temperature is a target temperature set as a temperature at which the injection molding machine 10 can start molding.

A status box 1531 includes a flag indicating whether to user the settings shown in the heater (molding) row 1530. A check (setting) in the status box 1531 indicates that the settings of the heater (molding) row 1530 are used.

In the heater (molding) row 1530, time entry fields 1533 through 1539 (examples of a first entry field) are shown one for each of the days of the week denoted by "Mon.," "Tue.," "Wed.," "Thu.," "Fri.," "Sat.," and "Sun." Furthermore, status boxes 1543 through 1549 are shown one for each day of the week. The status boxes 1543 through 1549 are check boxes for setting whether to control temperature increase according to the times entered in the time entry fields 1533 through 1539, respectively.

In the heater (molding) row 1530, a start time box 1532A and a completion time box 1532B are shown. The start time box 1532A is a check box for setting whether to use the times entered in the time entry fields 1533 through 1539 of the days of the week as the start time of temperature increase. The completion time box 1532B is a check box for setting whether to use the times entered in the time entry fields 1533 through 1539 of the days of the week as the completion time of temperature increase.

That is, in the case where the start time box 1532A is checked, the controller 700 starts to control heating with the heaters 313_1 through 313_5 so that the temperature starts to increase at the time entered in each of the time entry fields 1533 through 1539 each day of the week. Thereafter, as soon as the molding target temperature set zone by zone is reached, the controller 700 completes the control of heating with the heaters 313_1 through 313_5.

In the case where the completion time box 1532B is checked, the controller 700 starts to control heating with the heaters 313_1 through 313_5 so that the temperature increase is completed at the time entered in each of the time entry fields 1533 through 1539 each day of the week. That is, the controller 700 performs control such that the control of heating with the heaters 313_1 through 313_5 starts at the time calculated backward so that the temperature increase is completed at the entered time, and that the molding target temperature set zone by zone is reached and the control of heating with the heaters 313_1 through 313_5 is completed at the entered time.

The input receiving part 711 according to this embodiment receives entries or inputs to the above-described fields or boxes displayed on the calendar setting screen. For example, the input receiving part 711 receives a check in the start time box 1532A or the completion time box 1532B in the heater (molding) row 1530.

Likewise, the input receiving part 711 receives time information entered in the time entry fields 1533 through 1539 (examples of an entry field) in the heater (molding) row 1530. The input receiving part 711 updates the calendar timer setting information 721 according to the received information. The heating control part 715 controls heating with the heaters 313_1 through 313_5 according to the calendar timer setting information 721.

According to the example illustrated in FIG. 5, the input receiving part 711 receives a check in the completion time box 1532B, receives a check in the status box 1543 of Monday, and receives time information "8:00" entered in the time entry field 1533 of Monday in the heater (molding) row 1530. According to this, the controller 700 performs control so that the molding target temperature of each zone is reached and the increasing of temperature is completed at 8:00 A.M. by controlling heating with the heaters 313_1 through 313_5 provided one for each zone on Monday. That is, according to this embodiment, a worker can complete the increasing of temperature at a set time by checking the completion time box 1532B and setting the time entry field 1533, referring to the calendar setting screen illustrated in FIG. 5. Therefore, the worker can provide settings as desired through intuitive operation.

The controller 700 according to this embodiment displays the calendar setting screen including the time entry fields 1533 through 1539 of the heater (molding) row 1530 and the time entry fields 1513 through 1519 of the heater (heat retention) row 1510 as illustrated in FIG. 5. This enables a user to determine whether to keep the cylinder 310 warm or start molding with respect to each day of the week. In other words, the controller 700 can provide settings according to a situation each day of the week. Therefore, it is possible to improve user convenience.

Furthermore, according to the calendar setting screen as illustrated in FIG. 5, the start time boxes 1512A and 1532A and the completion time boxes 1512B and 1532B are displayed to make it possible to choose between setting the start time and setting the completion time. That is, in addition to making it possible to set the completion time, it is also made possible to set the start time the same as before. This enables a worker to control temperature increase as desired. Therefore, convenience is improved.

Next, a specific configuration for controlling temperature increase such that each zone reaches a target temperature at a completion time is described.

Figure 6:
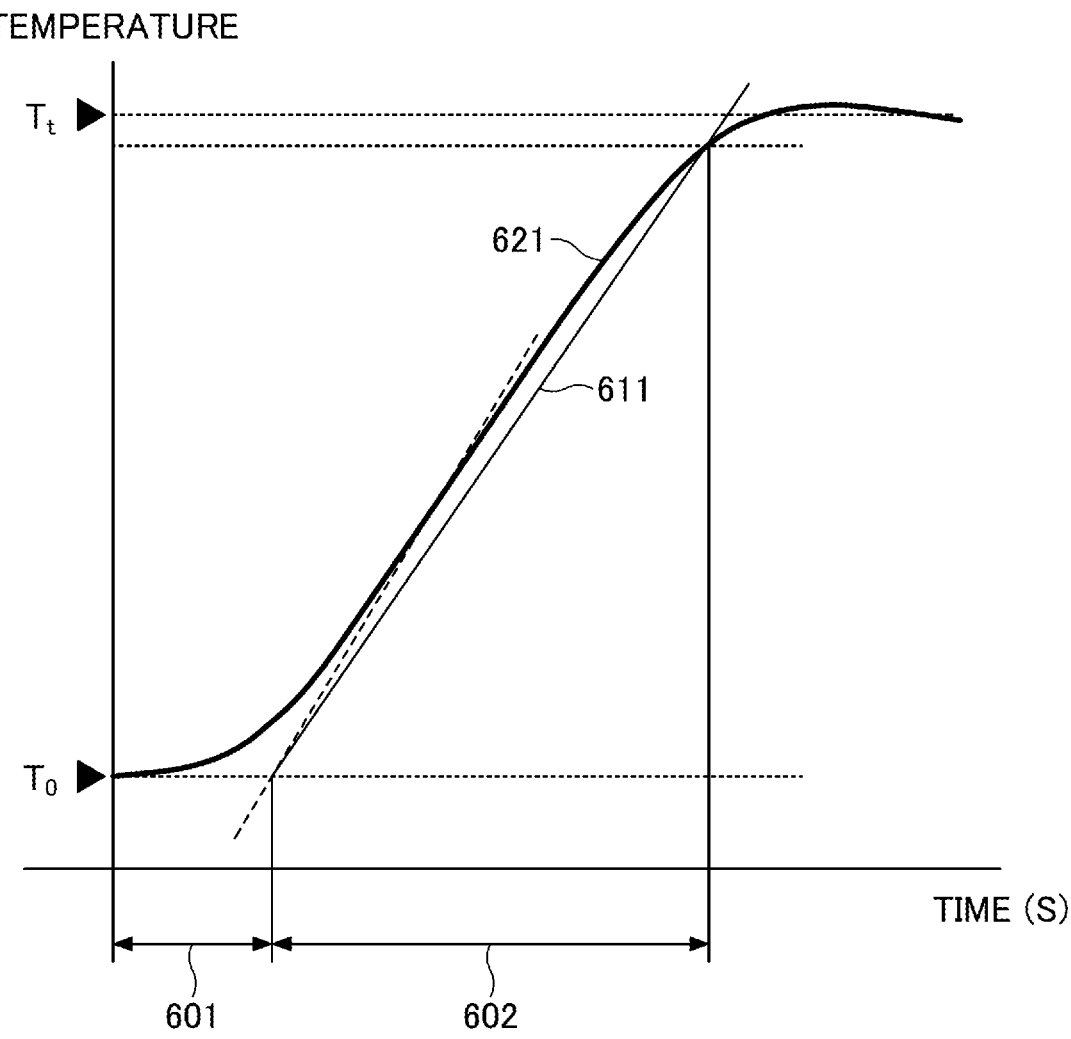
FIG. 6 is a graph illustrating changes in temperature in the case of performing heating with a heater and temperature increase control data in a zone stored in a storage medium according to the embodiment.

FIG. 6 is a graph illustrating changes in temperature in the case of performing heating with the heater 313 and the temperature increase control data 722 in a zone stored in the storage medium 702 according to this embodiment. A line 621 shown in FIG. 6 shows changes in temperature before reaching a target temperature (molding target temperature or heat retention target temperature) as a result of controlling heating with the heater 313 (one of the heaters 313_1 through 313_5) in a zone. As illustrated in FIG. 6, the temperature starts to increase after passage of a predetermined time (hereinafter referred to as "dead time 601") since the start of heating with the heater 313 (one of the heaters 313_1 through 313_5), and the temperature increases at a predetermined temperature increase rate 611 ($^{\circ}$ C./s) during rise time 602.

A temperature increase rate showing the (average) rate of increase of temperature per unit time during temperature increase and the dead time before starting the increasing of temperature according to the temperature increase rate in the case of controlling the heater 313 such that the heater 313 is constantly on are determined according to the heat capacity of the zone and the performance of the heater 313 provided in the zone.

Therefore, the storage medium 702 stores, as the temperature increase control data 722, the dead time 601, the rise time 602, the temperature increase rate 611 ($^{\circ}$ C./s), the molding target temperature, and the heat retention target temperature. The controller 700 according to this embodiment can perform control such that the increasing of temperature is completed at the completion time by referring to the temperature increase control data 722.

Some injection molding machines have been equipped with an automatic start function to start to increase temperature. According to the automatic start function, a control to start a heater at a preset time and a control to stop operating an injection molding machine at a preset time are automatically executed. For example, the automatic start function is used in the case of preliminary increasing temperature by the production start time by setting a time earlier than the work start time as the start time of the automatic start in a factory. Particularly, some heaters may require one hour or more in increasing temperature, which may significantly affect production.

The start time of the automatic start has been set from field experience or time measured in advance. When the start time of the automatic start is late, work cannot be started at the work start time. When the start time of the automatic start is early, the injection molding machine is left for a long time after the target temperature is reached, which may cause resin burns.

That is, there is a demand on the part of workers that it is desirable to complete the increasing of temperature before the work start time but it is not desirable to leave the injection molding machine for a long time after the increasing of temperature.

The dead time, the temperature increase rate, the molding target temperature, and the heat retention target temperature differ for reasons such as that the heat capacity of the cylinder 310 differs from zone to zone. Therefore, according to this embodiment, the controller 700 has the function of performing control such that the temperature increases at the same increase rate in all of the zones using the temperature increase control data 722 stored in the storage medium 702. This makes it possible for all of the zones to reach their respective target temperatures substantially at the same time.

The obtaining part 713 obtains detection results from various sensors provided in the injection molding machine 10. For example, the obtaining part 713 obtains the results of zone-by-zone temperature detection performed by the temperature detectors 314_1 through 314_5.

The calculation part 714 performs operations necessary for performing heating control. For example, in the case of automatically increasing temperature based on a set completion time, the calculation part 714 calculates the time at which to actually start to increase temperature.

The calculation part 714 according to this embodiment identifies temperature increase control data for a zone whose heat capacity is the largest, namely, temperature increase control data that requires the most time in increasing temperature up to the target temperature, among the zone-by-zone temperature increase control data 722 stored in the storage medium 702. Then, the calculation part 714 calculates time required before reaching the target temperature (molding target temperature or heat retention target temperature) based on the temperature increase rate, dead time, and set target temperature (molding target temperature or heat retention target temperature) of the temperature increase control data that requires the most time in increasing temperature up to the target temperature. Specifically, the following Eq. (1) is used for calculation. Then, the calculation part 714 calculates the time at which to actually start to increase temperature by subtracting the required time from the completion time. A variable a is a constant determined according to the mode of implementation. A starting temperature $T_0$ is the temperature detected by the temperature detector 314 provided in the zone of the largest heat capacity before the injection molding machine 10 starts to increase temperature.

$$\text{Required time} = ((\text{target temperature } T_t - \text{starting temperature } t_0)/\text{temperature increase rate}) + \alpha \cdot \text{dead time} \quad (1)$$

The heating control part 715 controls heating with respect to each of the heaters 313_1 through 313_5.

For example, in the zone of the largest heat capacity, the heating control part 715 controls heating with the heater 313 to follow the temperature increase control data for the zone. In other words, the heating control part 715 controls heating with the heater 313 to reach the target temperature set for the zone. A description of the method of heating the zone of the largest heat capacity is omitted. The zone of the largest heat capacity may be heated with a proportional-integral-derivative (PID) controller using the deviation of the temperature detected by the temperature detector 314 from a target value for each unit time shown by the temperature increase control data.

With respect to other zones, the heating control part 715 controls heating with the heater 313 to follow the degree of temperature increase of the zone of the largest heat capacity.

Figure 7:
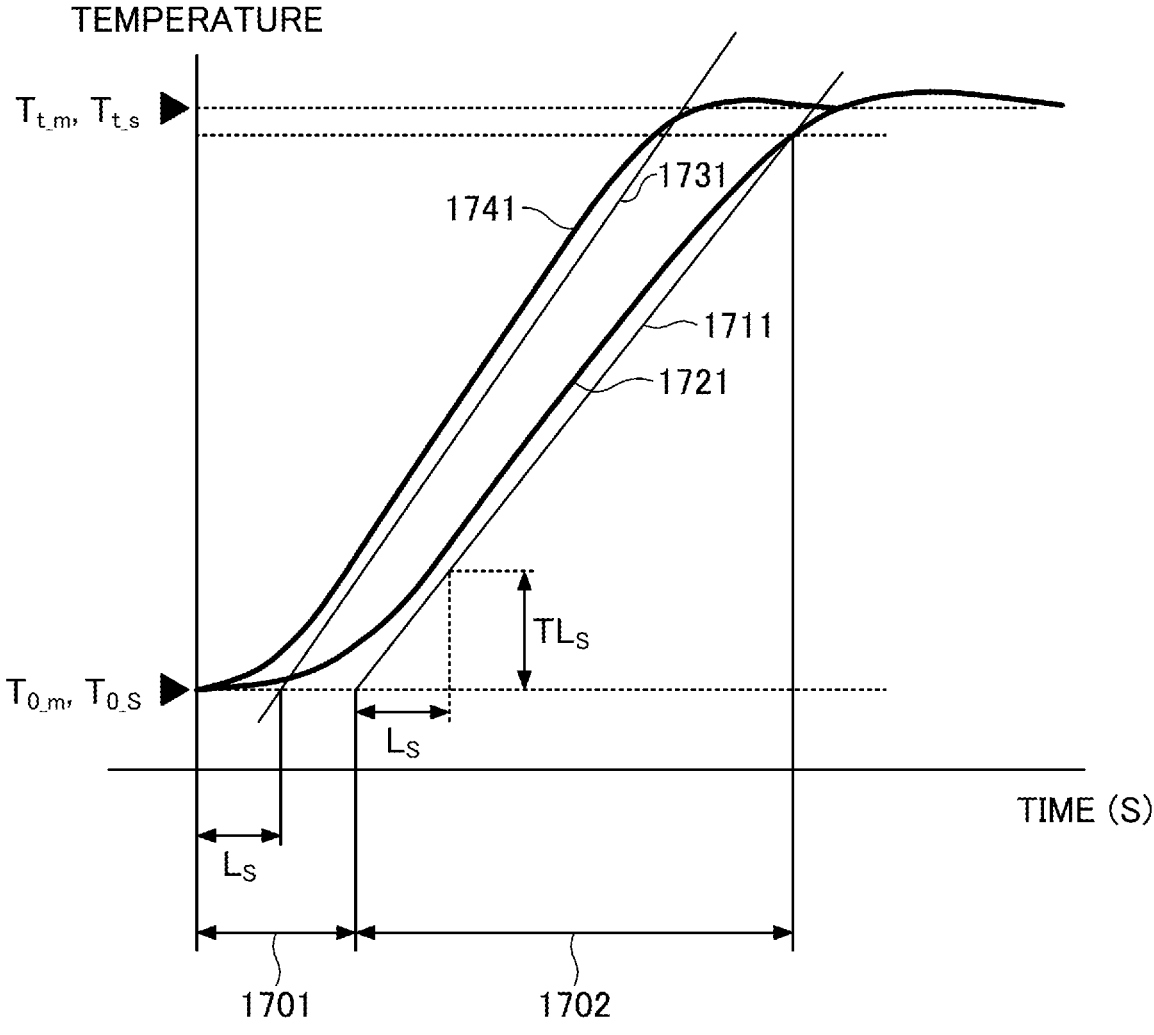
FIG. 7 is a graph illustrating an example of changes in temperature in a zone of the largest heat capacity and another zone when such control as to reach a target temperature is executed.

FIG. 7 is a graph illustrating an example of changes in temperature in the zone of the largest heat capacity and another zone when such control as to reach the target temperature is executed. According to the example illustrated in FIG. 7, a target temperature $T_{t\_m}$ (molding target temperature or heat retention target temperature) of the zone of the largest heat capacity is equal to a target temperature $T_{t\_s}$ (molding target temperature or heat retention target temperature) of the other zone. The target temperature, however, may differ from zone to zone. According to the example illustrated in FIG. 7, the temperature starts to increase from a starting temperature $T_{0\_m}$ in the zone of the largest heat capacity and from a starting temperature $T_{0\_s}$ in the other zone. The other zone according to this embodiment represents any zone among the zones other than the zone of the largest heat capacity.

A line 1721 shown in FIG. 7 shows changes in temperature in the case of performing heating with the heater 313 such that the target temperature $T_{t\_m}$ is reached in the zone of the largest heat capacity. As illustrated in FIG. 7, the temperature increase control data for the zone of the largest heat capacity are dead time 1701, rise time 1702, and a temperature increase rate 1711 (° C./s).

A line 1741 shown in FIG. 7 shows changes in temperature in the case of performing heating with the heater 313 such that the target temperature $T_{t\_s}$ is reached in the other zone different from the zone of the largest heat capacity. As illustrated in FIG. 7, the temperature increase control data for the other zone are dead time Ls and a temperature increase rate 1731 (° C./s). The temperature increase rate 1731 (° C./s) is higher than (>) the temperature increase rate 1711 (° C./s).

According to this embodiment, when heating is controlled such that the target temperature $T_{t\_s}$ is reached in the other zone, the target temperature $T_{t\_s}$ is reached is reached earlier than in the zone of the largest heat capacity. Therefore, according to this embodiment, the target temperature of the other zone is adjusted according to the current temperature of the zone of the largest heat capacity so that the time at which the zone of the largest heat capacity reaches the target temperature $T_{t\_m}$ and the time at which the other zone reaches the target temperature $T_{t\_s}$ are substantially the same.

According to this embodiment, the calculation part 714 calculates the target temperature of the other zone according to the current temperature of the zone of the largest heat capacity at predetermined time intervals.

First, the calculation part 714 calculates a temperature increase achievement rate R in the zone of the largest heat capacity using the following Eq. (2). A temperature $T_{m\_pres}$ is the current temperature detected by the temperature detector 314 in the zone of the largest heat capacity.

$$\text{Temperature increase achievement rate } R = (\text{current temperature } T_{m\_pres} - \text{starting temperature } T_{0\_m})/\text{target temperature } T_{t\_m} - \text{starting temperature } T_{0\_m}). \quad (2)$$

Based on the temperature increase achievement rate in the zone of the largest heat capacity, the calculation part 714 calculates a base value $T_b$ of the current target temperature corresponding to the temperature increase achievement rate in the other zone using the following Eq. (3):

$$\text{Base value } T_b = (\text{target value } T_{t\_s} - \text{starting temperature } T_{0\_s}) \times \text{temperature increase achievement rate } R + \text{starting temperature } T_{0\_s} \quad (3)$$

The calculated base value $T_b$ does not take heating during the dead time Ls and the difference between the current detected temperature and the target temperature in the other zone into consideration. Therefore, the calculation part 714 calculates a current target temperature $T_{t\_s\_pres}$ in the other zone by adding a temperature (TLs) equivalent to the dead time to the base value $T_b$ and subtracting the deviation between a current temperature $T_{s\_pres}$ of the other zone and the base value $T_b$ (the current temperature of the other zone in view of the temperature increase achievement rate in the zone of the largest heat capacity) from the base value $T_b$. Specifically, the calculation part 714 calculates the current target temperature $T_{t\_s\_pres}$ of the other zone using the following Eq. (4). The temperature TLs equivalent to the dead time is calculated by multiplying the dead time Ls by the temperature increase rate 1711 as illustrated in FIG. 7.

$$\text{Current target temperature } T_{t\_s\_pres}=T_b+TLs-(\text{current temperature } T_{s\_pres}-\text{base value } T_b). \qquad (4)$$

Figure 8:
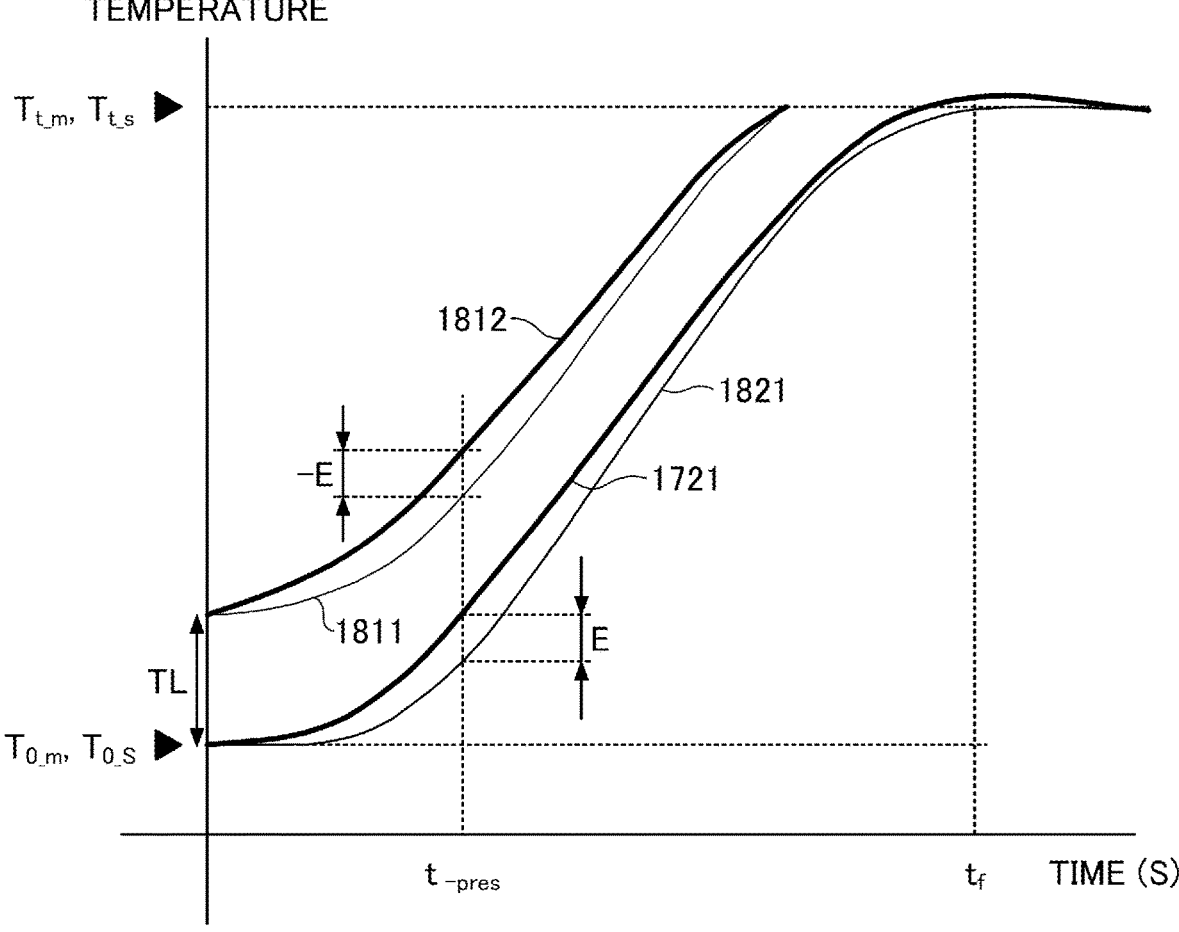
FIG. 8 is a graph illustrating changes in temperature in each zone in the case where heating is controlled zone by zone according to a current target temperature calculated by a calculation part according to the embodiment.

FIG. 8 is a graph illustrating changes in temperature in each zone in the case where heating is controlled zone by zone according to the current target temperature $T_{t\_s\_pres}$ calculated by the calculation part 714 according to this embodiment. The line 1721 shown in FIG. 8 shows changes in temperature in the case of performing heating with the heater 313 such that the target temperature $T_{t\_m}$ is reached in the zone of the largest heat capacity.

A line 1811 shows changes in temperature represented by the base value $T_b$+TLs. A line 1812 shows the current target temperature $T_{t\_s\_pres}$ in the other zone.

According to the example illustrated in FIG. 8, the target temperature $T_{t\_m}$ of the zone of the largest heat capacity is equal to the target temperature Its of the other zone, and the starting temperature Tom of temperature increase in the zone of the largest heat capacity is equal to the starting temperature $T_{0\_s}$ of temperature increase in the other zone. Therefore, the base value Tb is equal to the current temperature $T_{m\_pres}$ of the zone of the largest heat capacity.

Therefore, at time $t_{\_pres}$ in FIG. 8, a deviation E (current temperature $T_{s\_pres}$–base value $T_b$) is expressed as the current temperature $T_{s\_pres}$ of the other zone (the temperature of a line 1821 at time $t_{\_pres}$)–the current temperature $T_{m\_pres}$ of the zone of the largest heat capacity (the temperature of the line 1721 at time $t_{\_pres}$).

That is, the calculation part 714 can calculate the current target temperature $T_{t\_s\_pres}$ shown by the line 1812 by subtracting the "negative (–) deviation E" from the value shown by the line 1811. Because the current target temperature $T_{t\_s\_pres}$ is lower than the target temperature $T_{t\_s}$, the on/off control ratio of the heater 313 decreases. Therefore, it is possible to delay the time to reach the target temperature $I_{t\_s}$.

The heating control part 715 controls heating with the heater 313 of the other zone to reach the current target temperature $T_{t\_s\_pres}$ to realize the temperature changes shown by the line 1821 in the other zone.

As illustrated in FIG. 8, according to this embodiment, the above-described process enables the temperatures of the zones to reach their respective target temperatures substantially simultaneously at time $t_f$.

In other words, according to the controller 700, when the completion time is set for each day of the week on the calendar setting screen, the heating control part 715 can control heating with the heaters 313_1 through 313_5 provided one in each zone such that, with respect to each zone corresponding to a section where a solid molding material is present in the cylinder 310, the temperature detected by each of the temperature detectors 314_1 through 314_5 reaches the target temperature set zone by zone and the increasing of temperature is completed at the completion time.

This embodiment illustrates, as an example of the method of causing the target temperature set zone by zone to be reached to complete the increasing of temperature at a set completion time, adjusting the target temperature of the other zone according to the current temperature of the zone of the largest heat capacity so that the time at which the zone of the largest heat capacity reaches the target temperature $T_{t\_m}$ and the time at which the other zone reaches the target temperature $T_{t\_s}$ are substantially the same. This embodiment, however, does not limit the method of causing the target temperature set zone by zone to be reached to complete the increasing of temperature at a set completion time to the above-described technique, and may employ any technique as long as the technique causes all zones to reach their respective set target temperatures to complete the increasing of temperature at a set completion time. For example, the time to start to increase temperature may be adjusted zone by zone according to heat capacity so that the target temperature is reached at the completion time. Thus, any technique may be used, whether known or not, as long as the technique causes multiple zones to reach their respective target temperatures to complete the increasing of temperature at the completion time.

Figure 9:
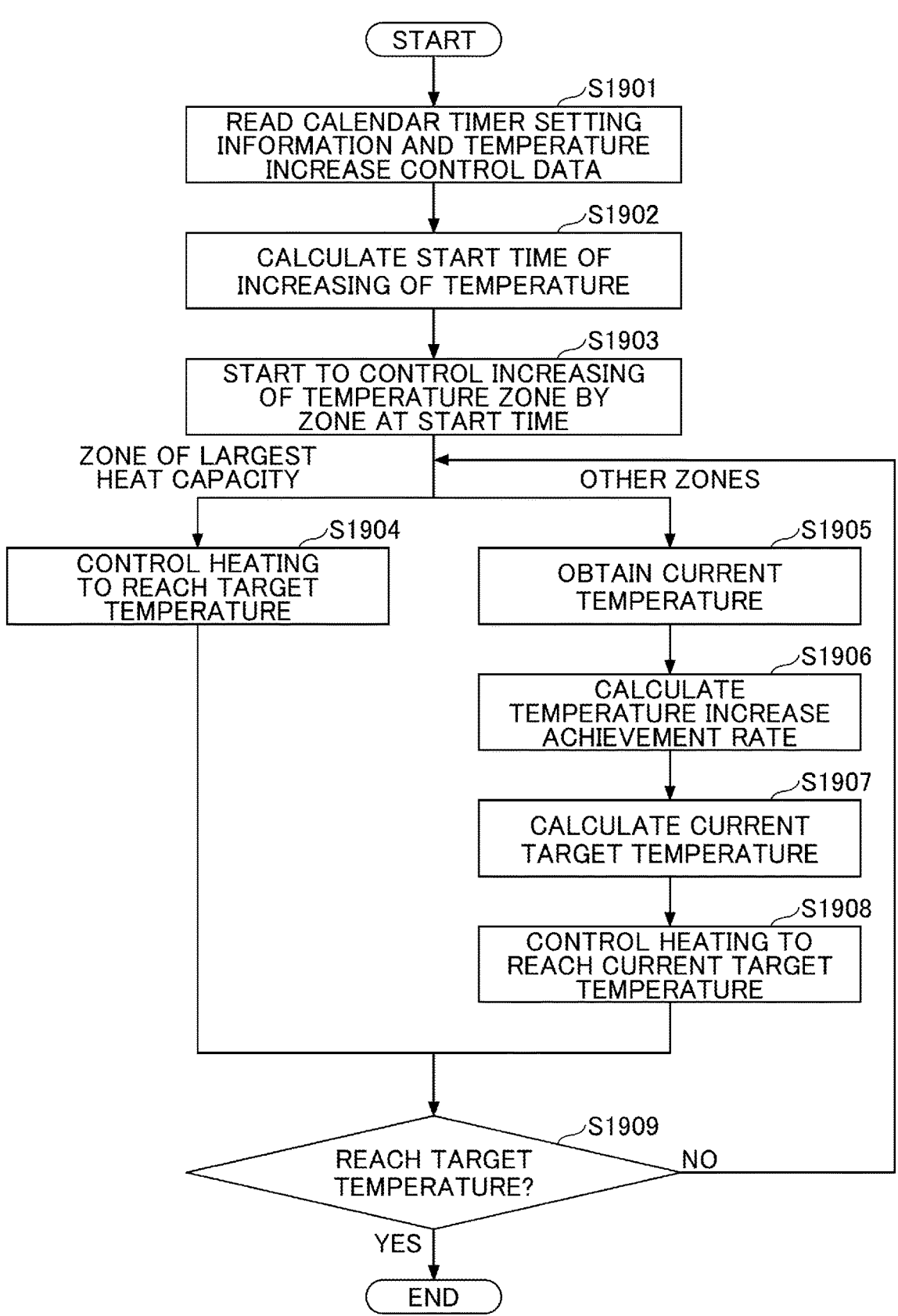
FIG. 9 is a flowchart in the case where the controller according to the embodiment controls heating according to a set completion time.

Next, a control that the controller 700 executes when the completion time is set for any day of the week on the calendar setting screen is described. FIG. 9 is a flowchart in the case where the controller 700 according to this embodiment controls heating according to a set completion time.

First, at step S1901, the calculation part 714 reads the calendar timer setting information 721 and the temperature increase control data 722 from the storage medium 702.

At step S1902, the calculation part 714, based on the temperature increase control data 722, calculates the start time of the increasing of temperature (time to start increasing temperature) for completing the increasing of temperature at the completion time set in the calendar timer setting information 721.

Thereafter, at step S1903, the heating control part 715 starts to control the increasing of temperature of each zone at the start time.

At step S1904, the heating control part 715 controls heating on the zone of the largest heat capacity to reach the target temperature $T_{t\_m}$ (molding target temperature or heat retention target temperature).

At step S1905, the obtaining part 713 obtains the current temperatures of the zones to perform control on the other zones.

At step S1906, the calculation part 714 calculates the current temperature increase achievement rate R based on the current temperature of the zone of the largest heat capacity among the obtained current temperatures of the zones.

At step S1907, the calculation part 714 calculates the current target temperature $T_{t\_s\_pres}$ for each of the other zones based on the temperature increase achievement rate R and the current temperatures of the other zones obtained by the obtaining part 713.

At step S1908, the heating control part 715, with respect to each of the other zones, controls heating so that the current target temperature $T_{t\_s\_pres}$ corresponding to each of the other zones is reached.

At step S1909, the heating control part 715 determines, based on the current temperatures obtained by the obtaining part 713, whether all of the zones have reached their respective target temperatures. In response to determining that the target temperatures are not reached (NO at step S1909), the heating control part 715 subsequently performs the process of step S1904 and the process of step S1905 and the subsequent steps.

In response to determining that all of the zones have reached their respective target temperatures (YES at step S1909), the heating control part 715 ends the process.

Thus, the controller 700 according to this embodiment, based on temperature changes in a zone whose time to reach the target temperature is the latest among the zones into which the cylinder 310 is divided, controls the heating of the other zones. This makes it possible for the zones into which the cylinder 310 is divided to reach their respective target temperatures substantially at the same time. As a result, it is possible to avoid a situation where when one of the zones has reached the target temperature, the other zones have not yet reached or have already reached their respective target temperatures. This makes it possible to avoid a situation where although one of the zones has reached the target temperature, molding work cannot be started because another zone has not reached the target temperature. Furthermore, it is also possible to prevent resin burns from being caused in the cylinder 310 by a zone that has already reached the target temperature when another zone has reached the target temperature.

The controller 700 according to this embodiment, by executing the above-described control, can cause all of the zones of the cylinder 310 to reach their respective target temperatures substantially simultaneously at the time entered and received as a completion time on the calendar setting screen. Therefore, according to the injection molding machine 10 of this embodiment, it is possible to start molding at the time desired by a worker. This makes it possible to improve work efficiency.

Furthermore, according to some injection molding machines, the start time of the increasing of temperature is entered on a calendar setting screen. In this case, to enter the start time, a worker has to guess the completion time of the increasing of temperature from the worker's experiences so far. Thus, even if such control as to synchronize the start and the completion of the increasing of temperature with respect to all zones is possible, it is still required to consider time necessary for the increasing of temperature to set the start time if the start time is the only settable item on the calendar setting screen.

According to this embodiment, by displaying the calendar setting screen as illustrated in FIG. 5, it is possible to enter the completion time. Based on this, the controller 700 can control the increasing of temperature to be completed by the completion time through the control based on the above-described configuration. Thus, according to the injection molding machine 10 of this embodiment, a worker may enter a work start time as the completion time of the increasing of temperature instead of making adjustment to complete the increasing of temperature at a work start time by entering the work start time based on the worker's experiences so far. Therefore, according to the controller 700 of the injection molding machine 10 of this embodiment, it is possible to reduce a worker's load in providing settings on the calendar setting screen. That is, the controller 700 according to this embodiment can improve operability for a user.

[First Variation]

The above-described embodiment illustrates the case where the controller 700 completes control of the increasing of temperature when the temperature detected by a corresponding one of the temperature detectors 314_1 through 314_5 in each zone reaches the target temperature. The above-described embodiment, however, is not limited to a technique to complete control of the increasing of temperature when the target temperature is reached. For example, in some cases, although the temperature detected by each of the temperature detectors 314_1 through 314_5 reaches the target temperature, more time is necessary before internal resin reaches the target temperature.

Therefore, according to the controller 700 according to a first variation, when the temperature detected by each of the temperature detectors 314_1 through 314_5 reaches the target temperature, the heating control part 715 stands by for a predetermined period of time (for example, 15 minutes) while controlling heating with the heaters 313_1 through 313_5 to cause resin inside the cylinder 310 to reach the target temperature. As in this first variation, the controller 700 may have a timer function for so-called cold protection.

In this case, the calculation part 714 calculates the start time of the increasing of temperature by adding a standby time set by the cold protection timer function to the time required for reaching the target temperature. According to the controller 700 of this variation, it is possible to improve efficiency in starting work by taking the temperature of resin inside the cylinder 310 into consideration.

[Second Variation]

The above-described embodiment illustrates the case where heating is controlled based on the completion time entered on the calendar setting screen. The use of the entered completion time, however, is not limited to heating control. As a variation, the controller 700 may save the completion time set in the calendar timer setting information 721 as a log after controlling heating with the heater 313 each day of the week.

This enables the controller 700 according to this variation to save the completion time of heating control, namely, the start time of work, as a log. That is, because the start time of daily work can be automatically saved, it is possible to reduce a worker's load in preparing a report on daily work progress.

[Third Variation]

The above-described embodiment and variations illustrate the case where a temperature-controlled member whose temperature is controlled in the injection molding machine 10 is the cylinder 310 provided in the injection molding machine 10. The above-described embodiment and variations, however, do not limit the temperature-controlled member to the cylinder 310, and the temperature-controlled member may include other members. Therefore, according to a third variation, the case where the temperature-controlled member provided in the injection molding machine 10 is other than the cylinder 310 is described.

According to this variation, the temperature-controlled member may include the nozzle 320 whose temperature is controlled by a heater or the like.

The same as in the cylinder 310 of the above-described embodiment, the temperature-controlled section of the nozzle 320 may be divided into multiple zones (for example, two zones). The nozzle 320 is provided with a temperature detector and a heater for each zone. Furthermore, the heat capacity may differ from zone to zone and the target temperature may differ from zone to zone in the nozzle 320.

Moreover, according to this variation, the temperature-controlled member may include the mold unit 800 whose temperature is controlled with a mold heater (not depicted).

The same as in the cylinder 310 of the above-described embodiment and the nozzle 320 of this variation, the temperature-controlled section of the mold unit 800 may be divided into multiple zones (for example, two zones). The mold unit 800 is provided with a temperature detector and a heater for each zone. Furthermore, the heat capacity may differ from zone to zone and the target temperature may differ from zone to zone in the mold unit 800.

The controller 700 according to this variation, by executing the same process as in the above-described embodiment, causes the target temperature set zone by zone to be reached to complete the increasing of temperature at a completion time set by a user with respect to the nozzle 320 and the mold unit 800. This makes it possible to produce the same effects as in the above-described embodiment.

The third variation illustrates the case where the temperature-controlled member includes the nozzle 320 and the mold unit 800. The temperature-controlled member, however, is not limited to the nozzle 320 and the mold unit 800, and may be the nozzle 320, the mold unit 800, or another member subjected to temperature control in the injection molding machine.

[Fourth Variation]

The injection molding machine 10 may be equipped with a mold unit that heats resin in a runner with a heater. According to a fourth variation, a configuration for heating resin in a runner is referred to as "hot runner." Therefore, this variation illustrates the case where the temperature-controlled member includes the hot runner of the mold unit.

The temperature-controlled section of the hot runner of the mold unit may be divided into multiple zones (for example, two zones). The hot runner may be provided with a heater for each zone. Furthermore, the hot runner may be provided with a temperature detector so that the temperature of each zone can be detected.

In the mold unit including the hot runner, a tip part has small heat capacity while a manifold has large heat capacity and takes time rising in temperature. Therefore, in the hot runner, with respect to each of the zones that differ in heat capacity, temperature control corresponding to the zone is performed. Furthermore, the target temperature may differ from zone to zone.

The controller 700 according to this variation, by executing the same process as in the above-described embodiment, causes the target temperature set zone by zone to be reached to complete the increasing of temperature at a completion time set by a user with respect to the hot runner of the mold unit. This makes it possible to produce the same effects as in the above-described embodiment.

According to the above-described embodiment and variations, the controller 700 receives an entry (input) of a completion time at which the increasing of the temperature of the cylinder 310 of the injection molding machine 10 is completed on the calendar setting screen that includes an entry filed for the completion time. This enables the controller 700 to perform control such that the injection molding machine 10 completes the increasing of temperature at the completion time and to save a log based on the completion time. Therefore, it is possible to reduce a worker's load. According to the controller 700 of the above-described embodiment and variations, inputting the completion time of the increasing of temperature makes it possible to intuitively use the injection molding machine 10 and thus improve convenience in the case of performing work with the injection molding machine 10.

The above-described embodiment and variations illustrate the case where a temperature detector (for example, the temperature detector 314) and a heater (for example, the heater 313) are provided for each of zones into which a temperature-controlled member (for example, at least one of the cylinder 310, the nozzle 320, the mold unit 800, and the hot runner of a mold unit) is divided. The present invention, however, is not limited to this configuration, and a temperature-controlled member (for example, at least one of the cylinder 310, the nozzle 320, the mold unit 800, and the hot runner of a mold unit) may be controlled with a single temperature detector (for example, the temperature detector 314) and a single heater (for example, the heater 313).

The controller 700 according to the above-described embodiment and variations, by controlling the increasing of the temperature of a temperature-controlled member to be completed at a completion time, can prevent the occurrence of a situation where the increasing of temperature is completed before a worker starts to work to leave the injection molding machine in the temperature increase completed state until the start of work or a situation where the increasing of temperature is not completed when a worker comes to a workplace. This makes it possible to improve efficiency in starting work in the injection molding machine and thus improve its productivity.

An embodiment of the present invention is described above. The present invention, however, is not limited to the above-described embodiment, and various variations, modifications, substitutions, additions, deletions, and combinations may be made without departing from the scope of the present invention.

What is claimed is:

1. A controller for an injection molding machine, comprising:

a hardware processor configured to output a screen, the screen including an entry field for entering a completion time at which increasing of temperature of a temperature-controlled member is completed, the temperature-controlled member being subjected to temperature control in the injection molding machine, receive an entry of the completion time in the entry field, and control heating with heaters provided for respective zones of the temperature-controlled member, each zone being a section in which temperature control is performed;

wherein each zone has a different heat capacity, and wherein a start time of heating by each heater is adjusted, based on heat capacity, so that the increasing of the temperature is completed at the entered completion time.

2. The controller as claimed in claim 1, wherein the hardware processor is configured to output the screen including the entry field, the entry field including a first entry field for entering the completion time at which the increasing of the temperature of the temperature-controlled member is completed to start the injection molding machine performing molding, and a second entry field for entering the completion time at which the increasing of the temperature of the temperature-controlled member is completed to retain heat in the injection molding machine.

3. The controller as claimed in claim 1, wherein the heaters are provided on the temperature-controlled member, the temperature of the temperature-controlled member is detected with a detector, and the control of the heating with the heaters is performed such that the temperature of the temperature-controlled member reaches a target temperature set for the temperature-controlled member.

4. The controller for the injection molding machine as claimed in claim 3, wherein the temperature-controlled member includes at least one of a cylinder, a nozzle, a mold unit, and a hot runner of the mold unit of the injection molding machine, the respective zones of the temperature-controlled member include a first zone and a second zone, the detector includes a first detector that detects the temperature of the first zone, and a second detector that detects the temperature of the second zone, the hardware processor is configured to set a first target temperature for the first zone, and a second target temperature for the second zone, and the control of the heating with the heaters is performed such that (i) the temperature detected with the first detector reaches the first target temperature set for the first zone, and (ii) the temperature detected with the second detector reaches the second target temperature set for the second zone.

5. The controller for the injection molding machine as claimed in claim 3, wherein the control of the heating with the heaters is performed such that (i) the temperature detected with the first detector reaches the first target temperature at the received completion time, and (ii) the temperature detected with the second detector reaches the second target temperature at the received completion time.

6. An injection molding machine comprising:

an injection unit configured to fill a mold unit with a molding material;

the temperature-controlled member subjected to temperature control; and the controller as set forth in claim 1.

7. The controller for the injection molding machine as claimed in claim 1, wherein the controlling of the heating is performed such that increasing of temperature of each zone among the respective zones is completed at the completion time.

8. A non-transitory storage medium storing a program for causing a computer to execute a process, the process including:

displaying an entry field for entering a completion time at which increasing of temperature of a temperature-controlled member is completed, the temperature-controlled member being subjected to temperature control in an injection molding machine;

receiving an entry of the completion time in the entry field, and controlling heating with heaters provided for respective zones of the temperature-controlled member, each zone being a section in which temperature control is performed;

wherein each zone has a different heat capacity, and wherein the process includes adjusting a start time of heating by each heater, based on heat capacity, so that the increasing of the temperature is completed at the entered completion time.

9. A controller for an injection molding machine, comprising:

a hardware processor configured to output a screen, the screen including an entry field for entering a completion time at which increasing of temperature of a temperature-controlled member is completed, the temperature-controlled member being subjected to temperature control in the injection molding machine, and receive an entry of the completion time in the entry field, and control heating with heaters provided for respective zones of the temperature-controlled member, each zone being a section in which temperature control is performed, wherein each zone is set to a different molding target temperature, and wherein a start time of heating by each heater is adjusted, based on the molding target temperature of the respective zone, so that the increasing of temperature is completed at the entered completion time.

* * * * *